United States Patent
Warburton et al.

(10) Patent No.: US 7,342,231 B2
(45) Date of Patent: Mar. 11, 2008

(54) DETECTION OF COINCIDENT RADIATIONS IN A SINGLE TRANSDUCER BY PULSE SHAPE ANALYSIS

(75) Inventors: William K. Warburton, 1300 Mills St., Menlo Park, CA (US) 94025; Hui Tan, Newark, CA (US); Wolfgang Hennig, Fremont, CA (US)

(73) Assignee: William K. Warburton, Menlo Park, CA (US)

(*) Notice: Subject to any disclaimer, the term of this patent is extended or adjusted under 35 U.S.C. 154(b) by 0 days.

(21) Appl. No.: 11/426,762

(22) Filed: Jun. 27, 2006

(65) Prior Publication Data

US 2007/0051892 A1 Mar. 8, 2007

Related U.S. Application Data

(60) Provisional application No. 60/695,948, filed on Jul. 1, 2005.

(51) Int. Cl.
*G01T 1/20* (2006.01)
(52) U.S. Cl. .............. 250/362; 250/356.2; 250/363.03; 250/370.1; 250/362; 250/370.07
(58) Field of Classification Search ............. 250/356.2, 250/363.03, 370.07, 370.1, 362
See application file for complete search history.

(56) References Cited

U.S. PATENT DOCUMENTS 4,037,105 A * 7/1977 Laurer ........................ 250/367

4,482,808 A * 11/1984 Tominaga et al. .......... 250/392
5,347,129 A 9/1994 Miller et al.

(Continued)

FOREIGN PATENT DOCUMENTS

WO WO 2007/005442 A2 1/2007
WO WO 2007/005442 A3 1/2007

OTHER PUBLICATIONS

Ely et al., Novel beta-gamma coincidence measurements using phoswich detectors,2005,Journal of Radionanlytical and Nuclear Chemistry, vol. 263 No. 1; pp. 245-250.*

(Continued)

*Primary Examiner*—David Porta
*Assistant Examiner*—Djura Malevic
(74) *Attorney, Agent, or Firm*—Townsend and Townsend and Crew LLP

(57) ABSTRACT

Pulse shape analysis determines if two radiations are in coincidence. A transducer is provided that, when it absorbs the first radiation produces an output pulse that is characterized by a shorter time constant and whose area is nominally proportional to the energy of the absorbed first radiation and, when it absorbs the second radiation produces an output pulse that is characterized by a longer time constant and whose area is nominally proportional to the energy of the absorbed second radiation. When radiation is absorbed, the output pulse is detected and two integrals are formed, the first over a time period representative of the first time constant and the second over a time period representative of the second time constant. The values of the two integrals are examined to determine whether the first radiation, the second radiation, or both were absorbed in the transducer, the latter condition defining a coincident event.

25 Claims, 9 Drawing Sheets

U.S. PATENT DOCUMENTS

| | | | | |
|---|---|---|---|---|
| 5,866,907 | A | * | 2/1999 | Drukier et al. ............. 250/366 |
| 5,873,054 | A | | 2/1999 | Warburton et al. |
| 6,448,559 | B1 | * | 9/2002 | Saoudi et al. ............... 250/367 |
| 7,065,473 | B2 | | 6/2006 | Warburton et al. |
| 2002/0195565 | A1 | * | 12/2002 | Lecoq ................... 250/363.03 |
| 2004/0129886 | A1 | * | 7/2004 | Lecoq ................... 250/363.03 |

OTHER PUBLICATIONS

Ely et al., "Novel Beta-Gamma Coincidence measurements Using Phoswich Detectors," *25th Seismic Research Review*, #6-01:533-541 (2003).

McIntyre et al., "Measurements of ambient radioxenon levels using the automated radioxenon sampler/analyzer (ARSA)," *J. Radioanalytical Nuc. Chemistry*, 248(3):629-635 (2001).

Reeder et al., "Gain calibration of a βγ coincidence spectrometer for automated radioxenon analysis," *Nuc. Instruments Meth. Phys. Res.*, A 521:586-599 (2004).

Reeder et al., "Beta-gamma counting system for Xe fission products," *J. Radioanalytical Nuc. Chem.*, 235(1-2):89-94 (1998).

Rynes et al., "Research and Development of Radioxenon Monitoring Systems, " *26th Seismic research Review*, 6-02:588-597 (2004).

* cited by examiner

DETECTION OF COINCIDENT RADIATIONS IN A SINGLE TRANSDUCER BY PULSE SHAPE ANALYSIS

STATEMENT AS TO RIGHTS TO INVENTIONS MADE UNDER FEDERALLY SPONSORED RESEARCH OR DEVELOPMENT

The U.S. Government has rights in this invention pursuant to Contract No. DE-FG02-04ER84121 awarded by the Department of Energy.

CROSS-REFERENCE TO RELATED APPLICATION AND DOCUMENTS INCORPORATED BY REFERENCE

This application claims priority from U.S. patent application Ser. No. 60/695,948 filed Jul. 1, 2005 for "Detection of Coincident Radiations in a Single Transducer by Pulse Shape Analysis" with inventors William K. Warburton, Michael Momayezi, Hui Tan, and Wolfgang Hennig, the entire disclosure of which (including attached documents) is incorporated by reference for all purposes.

BACKGROUND OF THE INVENTION

1. Field of the Invention

The present invention relates generally to systems for detecting two different radiations, such as a beta particle and a gamma-ray or an alpha particle and an x-ray, and determining if they are coincident, that is, if they are detected within a suitably short time interval of one another. In one class of cases the two radiations are created by a single nuclear decay or similar event, so that this time interval is nanoseconds or less, meaning that "coincident" is essentially "simultaneous" from a practical point of view. In another class of events, the nuclear decay producing the first radiation also creates a nuclear excited state that decays with a characteristic half life $\tau$, so that the time interval defining "coincident" is a few times $\tau$.

More specifically, the invention relates to the application of "phoswich" detectors to making coincidence measurements either of the first class or of the second class in cases where $\tau$ is shorter than or comparable to the natural time constants of the detector system. "Phoswich" is a coined term in the art that is the concatenation of phosphor and sandwich. Phoswich is sometimes used as a noun and sometimes as a descriptor for such terms as "detector," "detector assembly," "scintillator," "scintillator assembly," or "transducer." For simplicity, we will normally use phoswich as a noun.

The specific embodiments described relate to applying pulse shape recognition techniques to signals generated by a transducer assembly (or simply transducer) comprising a phoswich coupled to a photomultiplier tube (PMT) in order to determine whether, in a single detection event, the phoswich absorbed a first radiation, a second radiation, or both simultaneously. The techniques can also be applied when a photodiode replaces the PMT or when other detector systems entirely are employed. The application associated with the described specific embodiment, namely the detection of dilute radioactive Xenon (hereafter radio-Xenon) in atmospheric samples, is given particular attention only because this was the area in which the method was first developed.

The techniques that we have developed should therefore should not be construed as being limited to this specific application. Any detection system, for example, that produces output pulses whose time characteristics vary with type of detected event could be treated using the method.

2. A Synopsis of Current Prior Art

Coincident radiation detection is commonly used in a variety of nuclear and nuclear medicine measurement techniques. It is particularly powerful in the detection of rare events in the presence of significant background radiation when the desired event emits a pair of radiations. This is because, while random background events might mimic either member of the pair, the chance of randomly mimicking both scales as the product of the background rate's probability of mimicking either radiation times the length of the coincident window $\tau_C$. Thus, ignoring detection efficiencies, if $R_R$ is the rare event rate that produces radiations 1 and 2, while $R_{B1}$ and $R_{B2}$ are the background rates at the two radiations, then the ratio $\rho$ of $R_R$ to the "accidental" background rate $R_{B12}$ from coincident background events is:

$$\rho = \frac{R_R}{R_{B12}} = \frac{R_R}{R_{B1} R_{B2} \tau_c}. \tag{1}$$

Thus, for example, both $R_{B1}$ and $R_{B2}$ can be 100 times as large as $R_R$ and $\rho$ can still be 100 if $\tau_C$ is 1 microsecond, a fairly long coincidence inspection period.

In the past several years, scientists at Pacific Northwest National Laboratory (PNNL) have applied this technique to detecting radio-Xenon in atmospheric samples, an effort undertaken to develop instrumentation to support the International Nuclear Test Ban Treaty. Monitoring radio-Xenon in the atmosphere is one of several methods currently employed in the U.S. Atomic Energy Detection System program to detect nuclear weapons testing. Radio-Xenon is important in this context first because it is produced in significant amounts in a nuclear explosion; second, because, as a gas, it can escape from deep underground test sites; and third, because four radioactive isotopes are produced whose half life is sufficiently long that they can be detected far from the test site several days later. Even so, the amounts that would be present would be miniscule, even after prodigious concentration efforts. Estimates by PNNL scientists are that a statistically significant "signal" from a nuclear test might lie in the counts per minute to counts/hour range. At these levels background counting from nearby natural sources of radioactivity would completely overwhelm the radio-Xenon counts in the absence of the advantages conferred by coincident counting.

The current state of the art in radio-Xenon detection systems is an ARSA (Automated Radio-Xenon Sampler and Analyzer) system developed at Pacific Northwest National Laboratory [REEDER-1998, MCINTRYE-2001, REEDER-2004, RYNES-2004]. Because the radio-Xenon is greatly diluted by atmospheric mixing between the point of origin and the detection site, the system extracts all xenon from a large air volume and then measures its radioactivity in an extremely low background counter that is shown schematically in FIG. 1. The Xenon samples, typically only a few cc each, are placed in cylindrical cells 1 made of the fast plastic scintillator BC-404, each of which has a photomultiplier tube 2 (PMT) on either end. These cells are optically isolated 5 from and enclosed by pair of large NaI(T1) scintillator blocks 7 that are also optically isolated 5 from each other and each viewed by two large PMTs 8. The whole assembly is enclosed in a radiation shield (not shown) and housed in a Lead (Pb) cave to further reduce environmental background radiation.

The system's 12 PMT are all instrumented with preamplifiers, analog shaping amplifiers, multichannel analyzers, and time coincidence detection circuitry, all of which are standard commercial units known to those skilled in the art. When any PMT detects radiation, a test is made of the other PMTs to see if they also detect radiation. If a pair of small PMTs attached to a Xenon cell and a pair of large PMTs on the same NaI block all see light simultaneously, then the event is deemed valid and the electron energy is measured by summing the amplitudes of the pulses from the two small PMTs and the energy of the gamma-ray is measured by summing the amplitudes of the pulses from the two big PMTs.

The event is then added to a plot similar to the one shown in FIG. 2A [REEDER-2004], which displays the gamma-ray energy versus the electron or beta particle energy. Each horizontal bar represents a radio-Xenon decay mode that emits a gamma-ray of fixed energy (A=249.8 pkeV, B=81 keV, C=31 keV) in coincidence with a beta particle of fixed end point energy or a conversion electron of fixed energy. We will not go into the details here, but the different decay patterns are characteristic of different radio-Xenon isotopes, as described by by Reeder and McIntyre [REEDER-1998, MCINTRYE-2001]. As is well known in the Art, the narrower the gamma-ray lines are, the better the gamma-ray detector's energy resolution and the easier it is to detect a particular Xenon isotope against random background counts. FIG. 2B shows the gamma-ray spectra found by projecting the plot of FIG. 2A against the zero beta energy axis. All three lines resolve cleanly, with an achieved resolution of about 26% being reported at 81 keV [REEDER-2004].

While achieving high coincidence detection efficiency and acceptable energy resolutions for the gamma-ray lines, the current ARSA system has a number of drawbacks. In particular, while the ARSA system works well in a laboratory setting, it has not been easy to transfer its technology to an industrial manufacturer or particularly successful in field operation. Part of this lack of success stems from the complex electronics required to implement the required coincidence detections, part from the complex calibration procedures required to calibrate all 12 PMT gains, and part by the tendency of the PMT gains to drift with temperature and time. Because the ARSA system is intended for remote, unattended operation, a detector design that requires a regular, complex calibration is not acceptable.

Recognizing these issues, the PNNL scientists recently published a paper describing a new approach, indicated schematically in FIG. 3. [ELY-2003] In this detector system a cell of radio-Xenon 12 was presented to a phoswich comprising a 0.04" thick $CaF_2$(Eu) scintillator (940 ns decay constant) 13 coupled via a 0.25" thick quartz optical window 15 to a 2" by 2" cylindrical NaI(T1) crystal (250 ns decay constant) 16. This phoswich assembly was then optically coupled to a single PMT 18. The figure does not show the required optical housing and radiation shielding that are well understood in the art. With these dimensions, the $CaF_2$ scintillator stopped both conversion electrons and beta particles up to 900 KeV, while most x-rays and gamma-rays absorbed in the thicker NaI(T1) crystal. The PMT's anode output was connected to a charge integrating preamplifier 20 whose output was then fed into a fast digital signal processor 20 that captured and analyzed pulse waveforms from events in the detector. The signal processor measures the amplitude of the integrated preamplifier output pulses to determine the energy E of any detected event as is commonly done, but also took the unusual step of measuring the pulses' initial slopes S (or risetimes) as well.

FIG. 4 shows traces from two relatively energetic gamma-rays captured from the phoswich. The researchers proposed that radiation interactions in the phoswich could then be characterized according to their signal risetimes, with fast risetimes indicating interaction in NaI(T1) only, slow risetimes indicating interactions in $CaF_2$ only, and intermediate risetimes indicating combination or coincident events. Therefore, for each event, they produce an (S, E) pair, which would then be plotted similarly to FIG. 2A. FIG. 5 shows a set of results from a radio-Xenon sample. The lower horizontal band of pulses at 700 ns risetimes corresponds to $CaF_2$ only events from beta particle absorptions. The upper horizontal band at 1400 ns risetimes corresponds to NaI only events from gamma-ray absorptions. The "mixed" events corresponding to beta-gamma coincidences are the sloping bands that lie between the $CaF_2$ only and NaI only bands.

Unfortunately, as FIG. 5 shows, the slope cannot be resolved accurately enough to distinguish the three different event types, particularly at low energies. Thus, while this method of pulse shape coincidence detection works well enough to distinguish the $CaF_2$(Eu) only and NaI(T1) only events, the combination events—corresponding to the beta-gamma coincidences required for radio-Xenon monitoring, could only be poorly identified by this method and their energies could not be extracted with any accuracy. The authors therefore concluded that, even if an improved algorithm were developed, it would still be "challenging to separate the individual beta and gamma contributions of a single pulse with any precision" [ELY-2003]. Thus, while the approach of pulse shape coincidence detection showed potential for reducing the complexity of the original ARSA system, the PNNL researchers were disappointed to observer that its sensitivity and performance were insufficient to meet the requirements of the radio-Xenon monitoring application.

Therefore, for applications where one wished to sensitively detect two radiations in coincidence, such as the discussed beta-gamma coincidence, it would be beneficial to have a detector system that possesses the sensitivity of the ARSA system shown in FIG. 1 while also possessing the physical simplicity of the phoswich-based system shown in FIG. 3.

SUMMARY OF THE INVENTION

The present invention provides techniques, both method and apparatus, for using a single transducer to determine if two radiations, for example a beta particle and a gamma-ray, are in coincidence by examining the output signal produced by the transducer and using pulse shape analysis techniques to determine whether it was produced by the first radiation, the second radiation, or by both, which latter circumstance means that they were coincident within the time resolution of the technique. Conventional analysis may also be applied to simultaneously measure the radiations' energies. The technique can be shown to match or exceed the efficiency and energy resolution of previous techniques, while, since only a single transducer is employed, it is far more robust, easier to calibrate, and less expensive to produce and maintain.

While the technique was developed using a phoswich scintillator assembly coupled to a PMT, it can also be applied to the output of any transducer or detector that has the appropriate signal generating characteristics. The term "transducer" is used to denote the assembly that provides an electrical signal based on the radiation incident thereon. The term detector or detector assembly could also have been selected. In this particular case, the transducer includes the phoswich and the PMT, which is optically coupled to the phoswich.

In brief, the approach entails providing a transducer that has the following characteristics. First, when exposed to the first radiation, it produces an output signal pulse characterized by a first, shorter time constant $\tau_1$ and, in the preferred implementation, whose time integral or area is nominally proportional to that radiation's energy. Second, when exposed to the second radiation, it produces an output signal pulse characterized by a second, longer time constant $\tau_2$, whose pulse shape in nominally independent of the energy of the second radiation, and, again in the preferred implementation, whose time integral or area is nominally proportional to that radiation's energy. Thus, when exposed to both radiations simultaneously, it produces an output that is nominally the sum of these two responses. The transducer's response does not have to be particularly linear for the method to work, but the technique's accuracy improves with the linearity of the transducer's response. The transducer is directly coupled to a signal processor that carries out the following operations.

First the signal processor detects output pulses produced by the transducer when it absorbs radiation. Second, in each detected pulse, it forms two integrals, $A_1$ and $A_2$, the first, $A_1$, over a first integration period $S_1$ characteristic of $\tau_1$ and the second, $A_2$, over a second integration period $S_2$ characteristic of $\tau_2$. It then examines the values of the two integrals to determine whether the first radiation, the second radiation, or both were absorbed in the transducer. The latter case then defines the detection of a coincident absorption event in the transducer. Further, when the transducer is selected so that the areas of its output pulses are proportional to the energies of the radiations, the values of these two integrals, $A_1$ and $A_2$ can also be used to determine the energies of the radiations, whether they occur singly or in coincidence. The approach of the present invention therefore differs from the PNNL phoswich-based scheme in two aspects: first, the invention does not use an integrating preamplifier and, second, it measures signal integrals rather than relying solely on measuring derivatives (slopes). These two changes make the difference between a detection system that works very well and one that does not.

The specific embodiments use digital signal processing where the integral is formed by summing digitally sampled values of an analog signal. In the context of this application, the terms "integral(s)" and "integration" are intended to include such digital implementations as well as analog implementations where an analog signal is physically integrated over the prescribed time periods. In the digital case, the relevant periods might be more accurately referred to as summation periods, but the term "integration period" will be used for uniformity. The integration periods could equally well have been referred to as "integration regions," "integration intervals," "regions of integration," or the like. Further, the invention is not limited to digital or analog implementations. For example, WARBURTON-2006 describes analog, digital, and hybrid signal processing embodiments, thereby demonstrating that the precise implementation of the signal processing is not critical.

The exact placement of the two integration periods $S_1$ and $S_2$, is flexible. They can either overlap or cover separate time periods. The important point is that, since we are trying to distinguish between two pulse shapes, in this case ones with different decay times, $S_1$ and $S_2$ be located so that they are differentially sensitive to the two different shapes. This will then allow us to use their integrals to determine whether the first shape (decay time), the second shape (decay time), or both are present in a detected pulse. The first common case (Case 1) is to have $S_1$ cover the period where the transducer's $\tau_1$ output pulses have significant amplitude (i.e., start as soon as the pulse is detected and then last 2 to 4 times $\tau_1$) and to have $S_2$ start at the same time as $S_1$ and cover the period where the transducer's $\tau_2$ output pulses have significant amplitude (i.e., out to 2 to 4 times $\tau_2$). The second common case (Case 2) is to have $S_1$ as above, and to have $S_2$ start as soon as $S_1$ stops and end at the same point as in the case above so that it does not share any common time with $S_1$. In Case 1, both radiations contribute to both area integrals, while, in Case 2, only the second radiation can contribute to the integral over $S_2$.

Thus we form two linear combinations of the areas $A_1$ and $A_2$ in the two integrals to determine more accurately whether only a single radiation or two were absorbed in the transducer. The preferred linear combinations are ones that estimate the energies of the two radiations. If either energy is zero then that radiation was not absorbed. Using the energies it is then possible to reproduce plots similar to FIG. 2A showing the energy of one radiation versus the energy of the other when a coincidence is detected. While the accuracy of the technique is clearly improved when $\tau_1$ and $\tau_2$ have quite different values, for example by a factor of 10 or more, the technique does not place any actual constraint on their difference—the accuracy of the coincidence determination and the estimates of the radiations' energies simply degrade as the values of $\tau_1$ and $\tau_2$ approach each other. This method, with its use of direct integration periods, relies on coincident radiations both arriving within a time that is short compared to $S_1$. This criterion can also be relaxed, as described later, with the integration periods being laced to align with the arrivals of the two separate radiations in the transducer.

In a first implementation, the transducer is designed to look for coincidences between beta particles and gamma-rays and comprises a phoswich and a PMT optically coupled to the phoswich, where the first scintillator in the phoswich is a thin layer of the fast plastic scintillator BC-404, with a $\tau_1$ of 25 ns and the second scintillator in the phoswich is a thick layer of the crystalline scintillator CsI(T1), with a $\tau_2$ of 400 ns. Thus, in this transducer, the phoswich component converts the radiation's energy into visible photons and the PMT converts the visible photons into the electrical output pulse that we analyze. The dimensions of the scintillators are not critical beyond the requirements that the first layer be thick enough to absorb a substantial fraction of the first radiation and yet thin enough to pass the majority of the second radiation, while the second layer be thick enough to absorb a substantial fraction of the second radiation. The choice of materials is also non-critical, provided that these thickness criteria can be met and that the two materials' decay times are sufficiently different so that we can distinguish between them. Clearly, the more different the two decay times are, the easier this process becomes, other factors being comparable. In the described implementation intended to detect radio-Xenon, the BC-404 is 1 mm thick and the CsI(T1) is 1 inch thick. The first integration period $S_1$ is from time equal to zero (pulse detected) to 100 ns (4 times $\tau_1$) and the second integration period $S_2$ is from 100 ns to 1.2 μs (3 times $\tau_2$ Placing the periods $S_1$ and $S_2$ according to Case 2, an estimate $E_2$ of the energy of the second radiation is found from $E_2 = k_2 A_2$, where the constant $k_2$ is found by forming an energy spectrum when only the second radiation is present. Under these same conditions the ratio $R_{12}=A_1/A_2$ is also measured, where $R_{12}$ relates the contribution that a pulse purely due to the second radiation makes to the integral $A_1$ over the period $S_1$ compared to the contribution it makes to the integral $A_2$ over the period $S_2$. Because the transducer is selected to produce pulse shapes that are independent of the energy of the second radiation, the ratio $R_{12}$ is also valid when the first radiation is present, allowing us to compute the estimate $E_1$ of the energy of the first radiation as $E_1=k_1(A_1-R_{12}A_2)$, where the constant $k_1$ is found by forming an energy spectrum when only the first radiation is present and $A_2$ is zero. We note that if we had placed $S_1$ and $S_2$ according to Case 1, then we would also have had to measure a ratio $R_{21}=A_2/A_1$ when only the first radiation was present and that we would then find $E_2=k_2(R_{21}A_1-A_2)$.

The determination of whether the transducer absorbed the first radiation, the second radiation, or both in coincidence is then decided based upon whether $E_1$ is non-zero, $E_2$ is non-zero, or both are non-zero. The accuracy of the estimates $E_1$ and $E_2$ of the energies of the absorbed first and second radiations will de end to the extent to which the areas of the first and second output pulses are linear in the energies of the first and second radiations. In addition, if the baseline has a non-zero offset the accuracy of the measurement may be further improved by taking a baseline integral $A_b$ over a time $S_b$ before the pulse is detected, and subtracting $A_bS_1/S_b$ from $A_1$ and $A_bS_2/S_b$ from $A_2$ before making the previous computations of $E_1$ and E2. A prototype phoswich-PMT transducer of this design produced an energy resolution of 17% at 80 keV, which is a significant improvement over the 27% value achieved by the original ARSA system.

This first implementation is most appropriately employed in cases where the sample emitting the radiations to be measured is planar and can only be approached from a single side. In general, the thickness and diameters of the two scintillators would be adjusted so that the first scintillator effectively stops most radiations of the first type (here beta particles) while passing most radiations of the second type (here gamma-rays) while the second scintillator is dimensioned to effectively captures most radiations of the second type (here gamma-rays). The efficiency of this design is limited, however, because radiations are typically emitted randomly into $4\pi$ solid angle. Therefore the random chance of the first radiation going into the $2\pi$ half space occupied by the transducer is only 50%, as is the random chance of the second radiation. Thus, even if the transducer is 100% efficient at capturing both radiations, its maximum efficiency for detecting coincidences can only be 25%, the product of the two probabilities. Our second implementation is therefore designed to achieve higher efficiency in cases where the sample to be measured is a material, such as a gas, that is not restricted to being measured from a single side.

In a second implementation, the transducer was designed to look for coincidences between beta particles and gamma-rays emitted from a gaseous radio-Xenon sample and also comprises a phoswich and a PMT optically coupled to the phoswich. In this case the first scintillator is a hollow shell of BC-404 that is embedded within a cylinder of CsI(T1), with the sample radio-Xenon being placed within the inner shell. In a preferred implementation for radio-Xenon detection the inner BC-404 shell is a sphere of outer diameter 25 mm and wall thickness 1 mm. The outer CsI(T1) cylinder is 75 mm in diameter and 75 mm high. One face of the CsI(T1) cylinder is coupled to a PMT of the same diameter with optical coupling compound and its remaining surfaces are covered with a material of high specular reflectivity. As discussed in the case of our first implementation, other materials could have been effectively employed in the design.

None of these dimensions is critical. The inner sphere merely needs to be large enough to hold the sample gas volume, while its wall thickness has to be adequate to capture the majority of beta particles emitted from the sample without excessively capturing the x-rays and gamma-rays it emits. Thicknesses between 1 and 3 mm are all quite effective. The outer cylinder's dimensions need only to be large enough to efficiently capture the x-rays and gamma-rays emitted by the sample. The selected value is then an engineering tradeoff between increasing efficiency on the one hand and increasing both the costs of the CsI(T1) scintillator and PMT and the detected background rate on the other hand as the dimensions increase. As the time constants of these two materials are the same as those in the first implementation, the rest of the method remains the same. We note that not even the shapes of the two scintillators are critical. We investigated a design, for example, in which the inner shell was also a cylinder and achieved a design that was nearly as efficient as our preferred implementation.

In cases where the coincidence time between the arrival of the two radiations in the detector is no longer short compared to $S_2$ a more sophisticated pulse shape analysis is required. In this case, rather than making integrals over regions $S_1$ and $S_2$ whose locations are fixed, we instead use our discriminator, compared against a first threshold value, to identify the arrival of a pulse and place the start of the region $S_2$. We then set the threshold to a second, higher, value to look for the arrival of a fast component and, if one is detected, place $S_1$ there, at a time $\delta$ following the start of $S_2$. Since both integrals $A_1$ and $A_2$ now have contributions from both decay terms, we need to solve the same two linear equations for the energies $E_1$ and $E_2$ in terms of $A_1$ and $A_2$ as in Case 1 above, with the difference that the coefficients now depend upon the measured value $\delta$.

Further, in situations where the two pulse shapes do not differ sufficiently to allow a discriminator to reliably detect the interval $\delta$, we can digitally capture the detector's pulse output and fit it using a function of the for $y(i)=E_1T_1(i-\delta)+E_2T_2(i)$, where $T_1(i)$ is a template of the first output pulse shape having unit area, $T_2(i)$ is a template of the second output pulse shape having unit area, $\delta$ is the difference between the arrival times of the two radiations, and $E_1$ and $E_2$ are their areas (energies). As before, we determine whether the first radiation, the second radiation, or both are present based on whether $E_1$, $E_2$, or both are non-zero.

Other implementations may use a photodiode or other device instead of a PMT to read out a scintillator, or may use a suitable amplifier for other detector materials directly generating electric pulses when irradiated. The transducer may consist of more than two materials with different time characteristics, for example to detect coincidences between alpha, beta and gamma radiations; it may consist of a geometric arrangement of detectors primarily sensitive to radiation from different directions to determine coincidences in radiation arriving from different locations; it may consist of a single scintillator material that generates pulses with different time characteristics for different radiation types (e.g., CsI(T1)); it may consist of one or more materials generating pulses with different time characteristics for radiation of the same type but of different energy; or it may be any combination of the above as well as further implementations.

A further understanding of the nature and advantages of the present invention may be realized by reference to the remaining portions of the specification and the drawings.

DESCRIPTION OF SPECIFIC EMBODIMENTS

1. Embodiment for Use with Planar Samples 1.1. Physical Description

Figure 6:
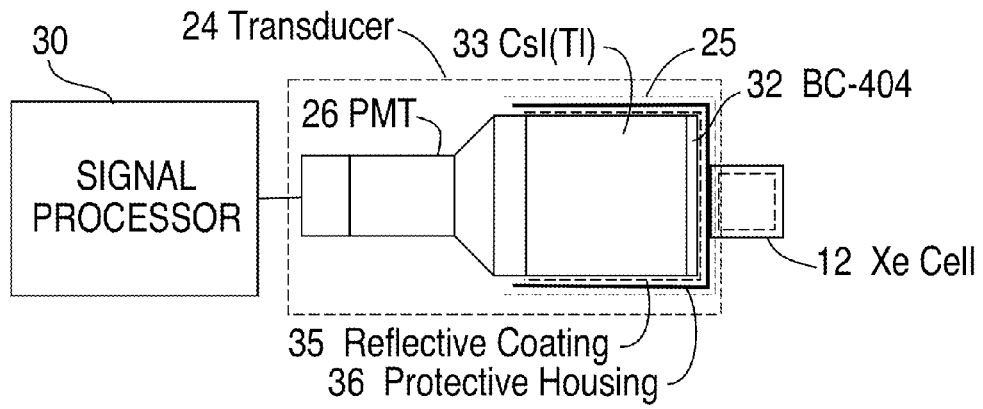
FIG. 6 shows a schematic diagram of a preferred implementation of the invention.
Figure 5:
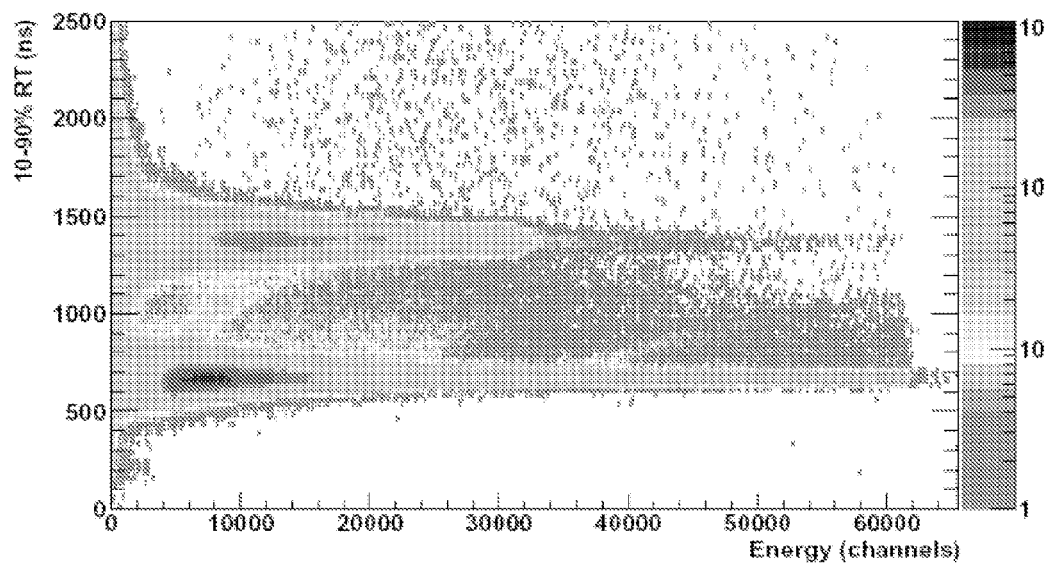
FIG. 5 shows a plot of risetime versus energy produced by the system of FIG. 3.

FIG. 6 shows a schematic diagram of an embodiment of the invention that is intended to detect coincidences between radiations emitted from a nominally planar surface and comprises a transducer 24 that includes a phoswich 25 attached to a PMT 26. The transducer's output is fed directly, without an integrating preamplifier, to a signal processor 30. The phoswich 25 is comprised of a thin layer of a first scintillator 32 optically coupled to a second, thicker scintillator 33, which in turn is optically coupled to the PMT 26. All surfaces of the phoswich except the one attached to the PMT are coated with a light reflecting layer 35 and enclosed in a protective housing that is typically made of thin aluminum. The details of optically coupling the scintillators together and to the PMT, as well of applying an effective reflective layer are well known to the art. Similarly, the details of selecting a PMT that has adequate speed and linearity characteristics as well as being well matched to the wavelengths of light emitted by the scintillators are also well known to the art.

The two scintillators were chosen based on the application and on the requirements of the technique. Our first requirement is for them to have significantly different decay times. The meaning of "significantly" will become clear as we explain the operation of the method. In the case of detecting radiations from radioactive Xenon (radio-Xenon), for which the invention was initially devised, we want to detect both a beta particle and a simultaneous x-ray or gamma-ray. For the Xenon isotopes whose half lives are long enough to be of interest ($^{131m}$Xe, $^{133g}$Xe, and $^{133m}$Xe) the beta energies range from 45 to 346 keV, the x-ray energies are 30 or 31 keV, and the gamma-ray energy is 81 keV.

The first scintillator must therefore be designed to substantially absorb beta particles with 45-346 keV energies while simultaneously transmitting most of the x-rays and gamma-rays. 1 mm of the, fast plastic scintillator BC-404 meets these constraints very nicely. First, BC-404 has a decay time less than 25 ns. Secondly, because of its low density, 1 mm will completely absorbs these beta energies while less than 5% of even the 30 keV low energy x-rays will either absorb or Compton scatter in it. BC-404 is a specific polyvinyltoluene-based scintillator material from Bicron. Other members of the family are available from Bicron, as are equivalent materials (e.g. EJ-200 from Eljen Technology). All of these materials, as well as other fast plastics or even very thin sections of higher density fast crystalline scintillators such as YAP(Ce) could be used effectively.

For the second scintillator material we selected CsI(Tl) because it is readily available, its 400 ns decay time is much longer time than that of the BC-404, it has good light output and energy resolution, and it has good stopping power for x-rays and gamma-rays. Similarly, while other high density scintillators, such as NaI(Tl) or BGO could replace the CsI(Tl), CsI(Tl) is preferred because of its combination of longer decay time, high light output, and relatively low cost.

We chose a 25.4 mm diameter cylinder 25.4 mm long simply because it was readily available and its diameter matched well to an inexpensive PMT. In an optimized design a significantly thinner piece could be used and still completely absorb 81 keV gamma-rays. The diameter of the BC-404 was also 25.4 mm to match the CsI(Tl) and PMT. The PMT was a Hamamatsu R6095. For good reflectivity, the phoswich was wraped in Teflon. The important phoswich parameters are therefore the two decay times: $\tau_1$ of 25 ns from the BC-404 and $\tau_2$ of 400 ns from the CsI(T1). For tests, we filled a thin aluminized Mylar bag with pure $^{133}$Xe and placed it in contact with the face of the phoswich, the whole assembly being placed into a dark Lead cave with 2" thick walls.

The design functions as follows, and differs from the operation of the ARSA system in that light from both the BC-404 and CsI(T1) are now processed by the same PMT, instead of being optically isolated from each other. Beta particles emitted by the radio-Xenon gas will be stopped in the plastic scintillator, whose resultant light output is then transmitted through the CsI crystal to the PMT. X-rays and gamma-rays from the Xe-decays penetrate the plastic scintillator with little absorption loss and undergo photo-absorption in the CsI, whose scintillation light also reaches the PMT. When the BC-404 thickness is correctly chosen, as in the present design, it will stop most beta particles while allowing most x-rays to pass through. We will now demonstrate how, by analyzing the pulse shapes coming from this phoswich-based transducer, we can determine if radiation interacted in the CsI, in the BC-404, or in both and thus detect beta-gamma coincidences.

We observe that conventional nuclear processing electronics (i.e., integrating preamplifiers and shaping amplifiers) cannot be effectively used with our phoswich design. This is because the conventional system integrates and shapes the PMT pulses and then determines each pulse's energy from its peak value. The shaping process causes nearly all time structure information to be lost, however. In the present case, for a Signal Processor 30 we used a Pixie-4 digital signal processor (available from XIA LLC of Hayward, Calif.). This digital signal processor, in contrast, directly digitized the PMT pulses, preserving all crucial information. Digital copies of the PMT pulse could then be processed by different filters to recover specific pieces of information about different time intervals within the pulses. This is not to imply that the method could not be carried out using appropriate analog signal processing. As we shall see, once the method is understood, it could clearly be implemented using an appropriately configured air of gated integrators, for example. We merely want to emphasize that the resultant signal processing would be distinctly non-standard.

1.2. Phoswich Pulse Shapes

Figure 7:
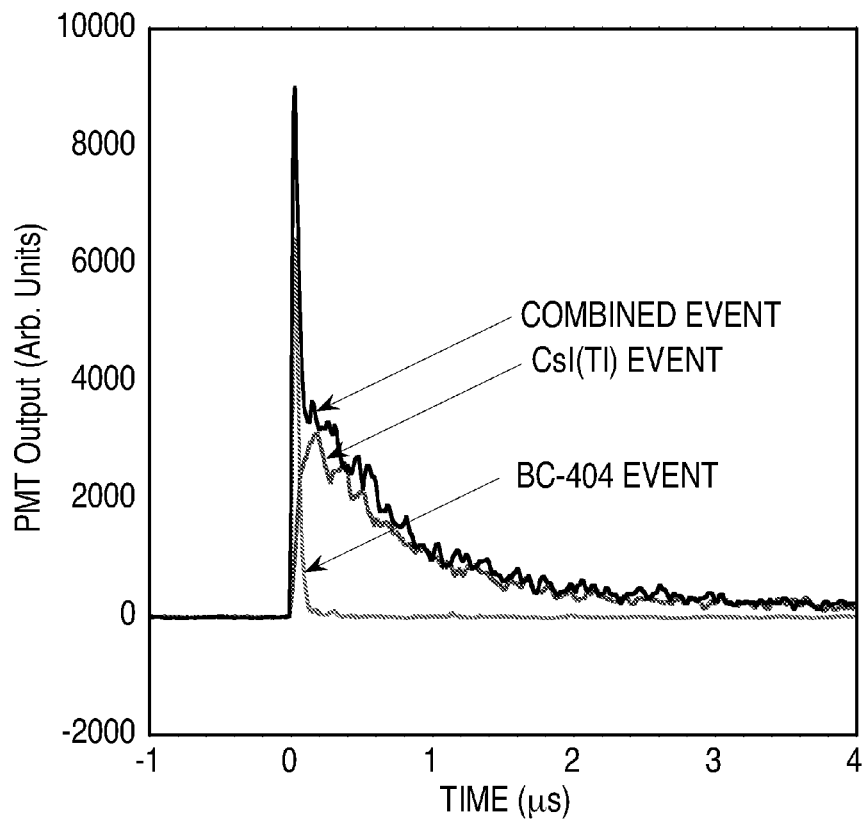
FIG. 7 shows signal traces captured using the implementation in FIG. 6.

FIG. 7 shows typical traces captured from the phoswich-PMT transducer shown in FIG. 6 when it is exposed to a source such as radio-Xenon that emits beta rays, gamma rays and both in coincidence. The very short pulses that decay in slightly over 100 ns are from the BC-404 scintillator when it is stimulated by beta rays. The longer pulses, which have approximately 100 ns risetimes and decay over several microseconds, are from the CsI(T1) when it is stimulated by gamma-rays. The "combined event" pulse arises when both are simultaneously stimulated and demonstrates a particular requirement of the invention—that when stimulated by both radiations, the phoswich's response is, at least approximately, the sum of its responses to the individual radiations. In the present implementation, the approximation is essentially an identity since the two light generation mechanisms are independent of each other (i.e., in separate scintillators) and the light collection efficiency is determined solely by their fixed geometry.

Figure 4:
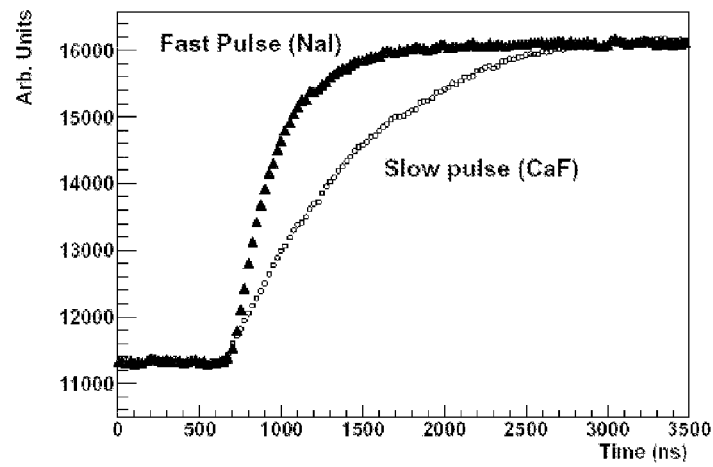
FIG. 4 shows output traces from the PNNL phoswich-based system of FIG. 3.

We note that the BC-404 component has completely decayed before the CsI(T1) component reaches its maximum. Thus, as is clear from the figure, the two pulses have very different temporal characteristics. This characteristic is by design and is one of the factors that make the present invention operate successfully. Compared to the prior art (FIG. 4) where the two extreme cases differ only in risetime by about a factor of two, in the present case the two pulse types not only differ in risetime, but also differ in duration by a factor of more than 30. This difference in decay time also means that, although the CsI(T1) is much brighter (i.e., emits more photons/keV of absorbed energy) than the BC-404, it peak amplitude is actually significantly smaller.

Figure 8:
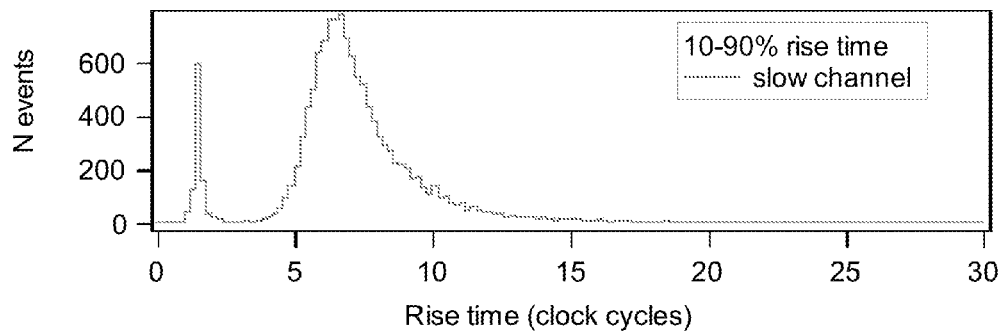
FIG. 8 shows a spectrum of measured initial slopes from a set of pulses collected using the implementation in FIG. 6.

It is indeed possible to separate the present pulses by risetime, as is shown in FIG. 8, where we show spectrum of 10-to-90% risetimes computed from a set of pulses captured as described below. In this case a clock cycle is 13.33 ns, so pulses with a BC-404 component have risetimes centered at about 25 ns while the slower CsI(T1) pulses have risetimes ranging from about 65 to 130 ns. While the two distributions are clearly separated, there are only two distributions: the slow CsI(T1) (i.e., gamma-only) pulses and any pulses with a BC-404 component (i.e., both the beta-only and the coincidence pulses). Since the latter need to be separated to detect the beta-gamma coincidences and our preferred method for doing so also cleanly separated out the gamma-only pulses, we omit the risetime measurement from our preferred implementation in the radio-Xenon measurement case. We retain the technique in our tool kit however, since it may be beneficial in other measurements.

The extreme difference between the decay times of the BC-404 and the CsI(T1), while it greatly simplifies the process of distinguishing between the two radiations, leads to a dynamic range issue that we had to treat carefully in order to obtain the best energy resolution. The largest beta particle energy that arrives from any of the radio-Xenon isotopes is 905 keV, which sets the maximum pulse amplitude that will be output by the BC-404. On the other hand, the smallest amplitude pulses will be output by the CsI(T1) when it absorbs emitted 30 keV x-rays. Our analog to digital converter must therefore s an this range while still having enough bits to accurately capture the shape of the CsI(T1).

1.3. Dynamic Range Issues

Figure 9:
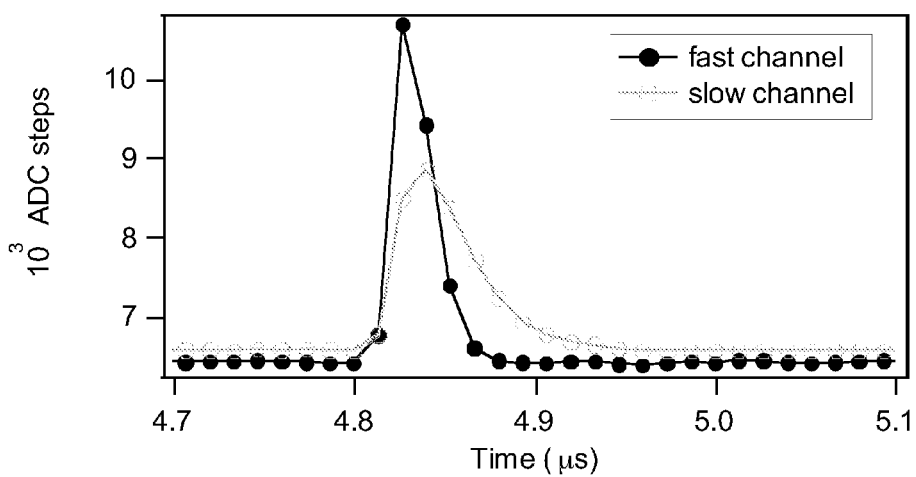
FIG. 9 shows fast BC-404 pulses captured using the Pixie-4's normal and reduced bandwidths.
Figure 10:
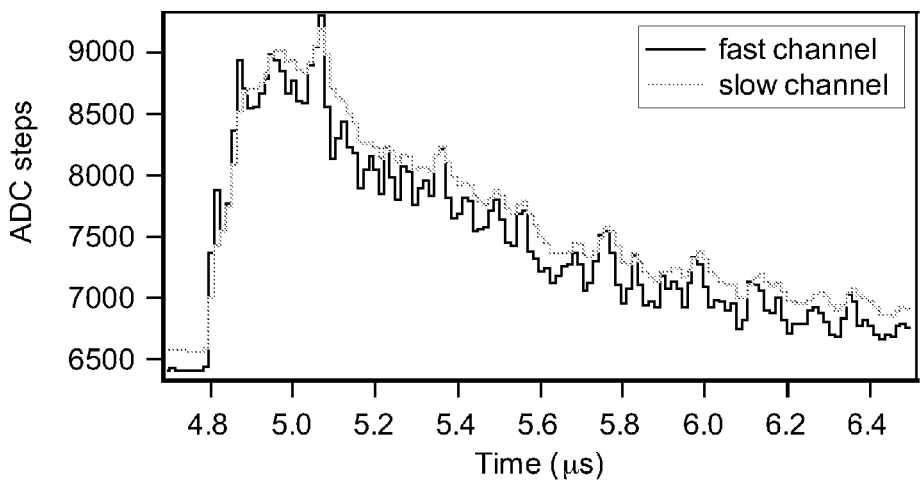
FIG. 10 shows slow CsI(Tl) pulses captured using the Pixie-4's normal and reduced bandwidths.

Working with the Pixie-4 gain set to 5 and the PMT operated at 900 V, we determined that a 662 keV gamma-ray produced a CsI(T1) output pulse of 500 ADC steps in amplitude (0.76 ADC ste s/keV), while a beta-ray of energy 300 keV produced a BC-404 output pulse of 3000 ADC ste s (10 ADC ste s/keV) for a ratio of 13/1. In order to reduce this ratio, we reduced the input bandwidth to the Pixie-4 from its normal, Nyquist value, of 8 dB at 37.5 MHz to 8 dB at 20 MHz. The effect of this change on the fast BC-404 pulses may be seen by reference to FIG. 9, where the same BC-404 pulse is captured simultaneously through two Pixie-4 channels, a "fast" channel with the original bandwidth and a "slow" channel with the reduced bandwidth. As seen, the amplitude of the pulse is cut approximately in half, while the pulse duration is increased from 5 to 9 samples (67 to 120 ns). As may be seen from FIG. 10, which shows a slow CsI(T1) pulse also taken simultaneously through the fast and slow channels, the only significant effect here is to reduce the trace's high frequency noise. Reducing the bandwidth is therefore beneficial because it reduces the dynamic range between the BC-404 and CsI(T1) pulses, because it reduces the noise in the CsI(T1) signals, and, because it increases the number of BC-404 samples, will increase the accuracy of our measurement of the BC-404 pulse areas and, thus, of our fast channel energy estimates.

Our electronics are therefore set up as follows. The Pixie-4 has a 14 bit ADC sampling at 75 MHz (13.33 ns intervals). Its gain is 5 and it is bandwidth limited to 8 dB at 20 MHz. The ADC dynamic range is $2^{14}=16,000$. A 300 keV beta ray produces a pulse height of about 1500 ADC steps, so the largest beta ray energy of 905 keV produces a pulse height of 4,525 ADC ste s. A 662 keV gamma-ray still produces 500 ADC ste s, so the smallest x-ray energy of 30 keV produces a pulse of amplitude 23 ADC ste s. While this is rather small, it is still well above the noise floor of the PMT. While the further work described with this embodiment uses these settings, it is already clear that the gain could be increased by a factor of about 3 (either by increasing the Pixie-4 gain to 15 or by increasing the PMT voltage somewhat). In this case the largest beta-ray would produce a pulse of amplitude 13,575 ADC ste s (about 83% of maximum) which leaves adequate overhead for offsets and coincident trace sums, and the 30 keV x-ray produces a more comfortable CsI(T1) pulse height of 68 ADC units.

In cases where the dynamic ranges of the two light components are too large to handle successfully with a single ADC, we note that it would work perfectly well to buffer the PMT output signal and process it in two independent digitization channels, one whose gain was set to accommodate the dynamic range of signals from the first scintillator and one whose gain was set to accommodate the dynamic range of signals from the second scintillator. The summations required for the pulse shape analysis ste s described in the following could then be obtained from the separate channels and the rest of the analysis carried out as described, making appropriate adjustments for the gain differences, of course.

1.4. Pulse Shape Analysis to Extract Component Energies

In the following discussion in connection with FIG. 11, FIG. 12, and FIG. 13, the subscripts "p" and "c" will be used to denote plastic (e.g., BC-404) and crystal (e.g., CsI(T1)), respectively, and the subscript t "0" will be used in connection with an integration period before an event for the purpose of a baseline correction. The subscript ts "β" and "γ" denote beta and gamma radiation. The formation of an additional integral (summation) for the purpose of baseline correction is preferred, but is not a critical aspect of the invention.

Figure 11:
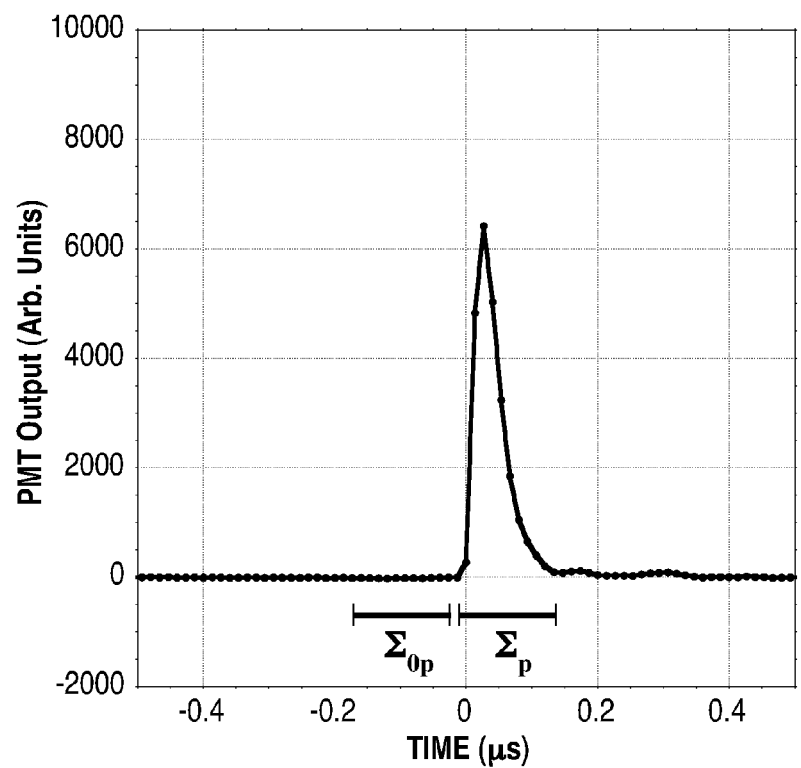
FIG. 11 shows a typical pulse resulting from a beta-ray exciting BC-404, together with the placement of integration (summation) periods to measure its area.

FIG. 11 repeats FIG. 7 for an isolated output pulse resulting from the absorption of a beta-ray in the BC-404 scintillator. Its 10-90% risetime is about 25 ns and its entire duration is about 10 samples, or 133 ns. If we wish to measure the pulse's area, which measures the scintillator's total light output and which is nominally proportional to the beta-ray's energy in a typical scintillator, we can see that this is easily done by forming the sum $\Sigma_{\beta p}$ (subscript t β for "beta only" and p for "plastic") of the pulse's values over the period labeled $\Sigma_p$ in the figure where they are significantly above background and then subtracting the sum $\Sigma_{0p}$ of the values over the period labeled $\Sigma_{0p}$ (subscript "0" for baseline) of equal length situated in the baseline period preceding the pulse. The placement of the integration period relative to the pulse's rising edge is typically handled by using a discriminator threshold crossing to detect the rising edge, and this and other methods for doing so are well known to the art (see, for example, WARBURTON-1999 and WARBURTON-2003) and will not be further described. Then, by performing a calibration measurement with particles of known energy, we can write:

$$E_\beta = k_p(\Sigma_{\beta p} - \Sigma_{0p}) = k_p \Sigma'_{\beta p} \tag{2}$$

where $k_p$ is the normalization constant found by the calibration and $\Sigma'_{\beta p}$ is the baseline corrected integral. How accurate this procedure is, depends of course on the scintillator material used and the linearity of its light output with excitation energy. The quantity $E_p$, of course, can always be computed as a measure of the area under the curve.

The issue of baseline correction requires further comment. Normally the output of a PMT in the absence of a pulse is essentially zero, so that, for the very low count rates that will be typical of the present work, the baseline correction may not be necessary. If, however, the electronics between the PMT and the ADC contribute some DC offset, then the correction becomes useful. It should also be noted that many scintillators also display phosphorescence, so that they continue to emit light at very low levels for a long time after they are initially stimulated. In this case as well, a baseline correction will enhance the accuracy of the area measurements. We should also note, that, as is common in digital pulse processing, the accuracy of the baseline correction may be increased by replacing the shown single baseline measurement with an average of multiple baseline measurements taken at earlier times when the signal has been reliably determined to be at baseline. [WARBURTON-1999, WARBURTON-2006]

Figure 12:
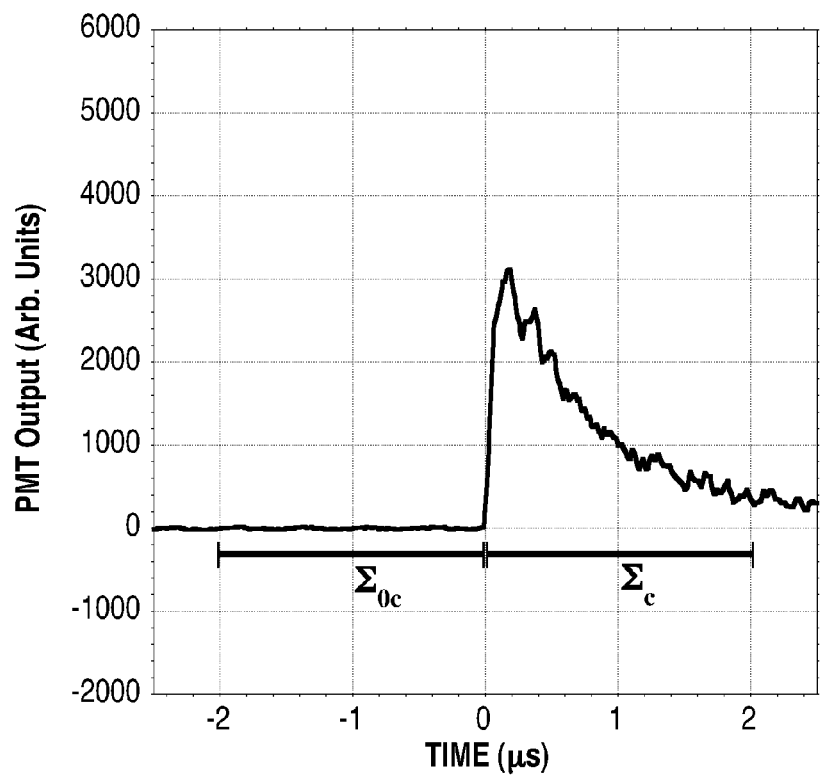
FIG. 12 shows a typical pulse resulting from a gamma-ray exciting CsI(Tl), together with the placement of integration (summation) periods to measure its area.
Figure 13:
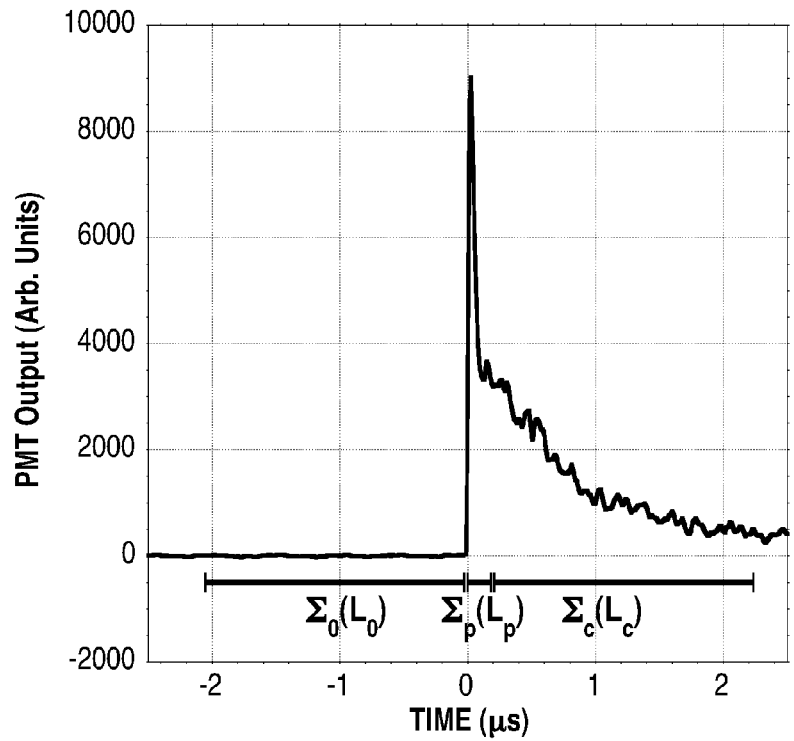
FIG. 13 shows a typical pulse resulting from a beta particle exciting BC-404 while a gamma-ray simultaneously excites CsI(Tl) together with a preferred placement of integration periods to measure their individual areas.

FIG. 12 shows a slow output pulse resulting from the absorption of a gamma-ray in the CsI(T1) scintillator. Making similar arguments and assignments as in the case of the plastic scintillator, we can estimate the energy $E_c$ (subscript γ for "gamma only" and c for "crystal") deposited in the crystalline CsI(T1) scintillator as:

$$E_\gamma = k_c(\Sigma_{\gamma c} - \Sigma_{0c}) = k_c \Sigma'_{\gamma c}, \tag{3}$$

where the normalization constant $k_c$ will be found by exposing the CsI(T1) to gamma-rays of known energy and $\Sigma'_{\gamma c}$ is the baseline corrected integral.

Now, in the case of the combined pulse, for the placement of $S_1$ and $S_2$ as just described (Case 1) both integrals will contain terms from both radiations. Thus:

$$\Sigma'_c = \Sigma'_{\gamma c} + \Sigma'_{\beta c} \text{ and } \Sigma'_p = \Sigma'_{\gamma p} + \Sigma'_{\beta p}, \tag{4}$$

where we wish to extract $\Sigma'_{\gamma c}$ and $\Sigma'_{\beta p}$ in order to obtain the energies $E_\gamma$ and $E_\beta$ through the use of Eqns. 2 and 3. In order to accomplish this, we use the principle that the response of each scintillator in the phoswich is both independent of the other and nominally independent of the energy of the radiation it absorbs. That is, the shape of the CsI(T1) signal does not depend upon the energy the CsI(T1) absorbs or whether the BC-404 is interacting with some radiation, and, similarly with the shape of the BC-404 signal. This allows us to define the two ratios:

$$R_{\beta c} = \frac{\Sigma'_{\beta c}}{\Sigma'_{\beta p}} \text{ and } R_{\gamma p} = \frac{\Sigma'_{\gamma p}}{\Sigma'_{\gamma c}}, \tag{5}$$

rewrite Eqn. 4 as $$\Sigma'_c = \Sigma'_{\gamma c} + R_{\beta c}\Sigma'_{\beta p} \text{ and } \Sigma'_p = R_{\gamma p}\Sigma'_{\gamma c} + \Sigma'_{\beta p}, \tag{6}$$

and solve for $E_\gamma$ and $E_\beta$ by finding $\Sigma'_{\gamma c}$ and $\Sigma'_{\beta p}$ in terms of the measured $\Sigma'_c$ and $\Sigma'_p$:

$$E_\gamma = k_c\Sigma'_{\gamma c} = k_c\frac{\Sigma'_c - R_{\beta c}\Sigma'_p}{1 - R_{\beta c}R_{\gamma c}} \tag{7}$$

and $$E_\beta = k_p\Sigma'_{\beta p} = k_p\frac{\Sigma'_p - R_{\gamma p}\Sigma'_c}{1 - R_{\beta c}R_{\gamma p}}.$$

By their definitions, the constant $R_{\gamma p}$ can be determined by making measurements of the ratio $\Sigma'_p/\Sigma'_c$ when the phoswich is excited only by gamma-rays, while the constant $R_{\beta c}$ can be determined by making measurements of the ratio $\Sigma'_c/\Sigma'_p$ when the phoswich is excited only by beta-rays. It is further worth noting that, in the special case where the integration period $S_1$ is both long enough to completely integrate the fast plastic response and is completely contained within $S_2$, $R_{\beta c}$ will be identically equal to unity and need not be measured.

In Eqn. 7, both integrals (summations) $\Sigma'_p$ and $\Sigma'_c$ contain contributions from both radiations, so that the light output fluctuations from both scintillators contribute to the energy resolution of both measurements. Typically in these measurements, the accuracy of the beta-ray energy is not critical, since it does not typically have sharp spectral lines. The gamma-ray spectrum, on the other hand, typically does have sharp lines and the better these can be resolved the higher the rejection ratio of unwanted events can be obtained. Our preferred implementation, therefore, redefines the integration periods $\Sigma_0$, $\Sigma_p$, and $\Sigma_c$ as shown in FIG. 13, where the lengths of these integration periods are $L_0$, $L_p$, and $L_c$, respectively (Case 2). These periods are typically, but not necessarily contiguous, with $L_p$ being just long enough to capture the entire area of a fast BC-404 pulse (e.g., 133 ns, or 10 samples), $L_c$ being long enough to capture a large enough fraction of the CsI(T1) pulses to produce good energy resolution (e.g., 2 µs), and $L_0$ being long enough to provide an accurate correction for $\Sigma_c$ (e.g., 2 µs or more). For other phoswich materials, these lengths would be adjusted to other values to obtain optimum results, as will be clear to those skilled in the art.

The analysis proceeds as before, expect that now there is no contribution of the beta radiation to $\Sigma'_p$, so that $R_{\beta c}$ equals zero. Thus Eqn. 7 simplifies to:

$$E_\gamma = k_c \Sigma'_{\gamma c} = k_c \Sigma'_c \text{ and } E_\beta = k_p \Sigma'_{\beta p} = k_p(\Sigma'_p - R_{\gamma p}\Sigma'_c), \quad (8)$$

where there is only the single ratio $R_{\gamma p}$ to measure with a pure gamma-ray source and the baseline corrected areas are:

$$\Sigma'_c = \Sigma_c - \left(\frac{L_c}{L_0}\right)\Sigma_0 \equiv \Sigma_c - M_{c0}\Sigma_0 \quad (9)$$

and $$\Sigma'_p = \Sigma_p - \left(\frac{L_p}{L_0}\right)\Sigma_0 \equiv \Sigma_c - M_{p0}\Sigma_0. \quad (10)$$

If desired, the length ratios $M_{c0}$ and $M_{p0}$ can both be chosen to be the form ($\frac{1}{2^n}$), so that the required multiplications can be trivially carried out in a gate array by bit shifting.

Using either the Case 1 or Case 2 placement of $S_1$ and $S_2$, it now becomes straight-forward to distinguish between the three possible cases {beta only, gamma only, coincidence of beta and gamma} by noting whether $E_\beta$, $E_\gamma$, or both are non-zero (above appropriate thresholds). Thus $E_\gamma$ equals zero corresponds to the beta only case, $E_\beta$ equals zero corresponds to the gamma only case, and both being non-zero corresponds to the coincidence case. In this way we have been able to determine whether or not two radiations (the beta and gamma rays) are in temporal coincidence by a shape analysis (energy measurement) of the phoswich-based transducer's output in response to the different cases.

Figure 14:
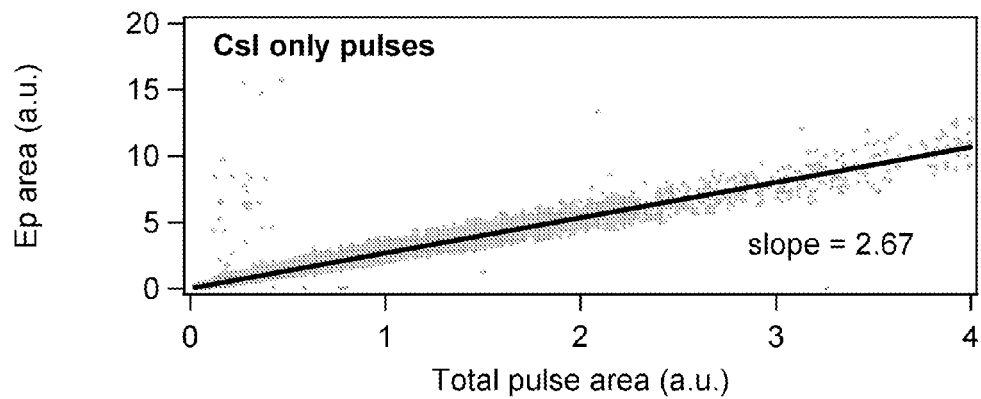
FIG. 14 shows a plot of total CsI(Tl) pulse area versus area in the first 100 ns integration period $\Sigma_p$ for a set of pulses with no fast component.

FIG. 14 shows the result of a measurement for the ratio $R_{\gamma p}$ using CsI(T1) pulses. As may be seen, CsI(T1) is a fairly linear scintillator and a single fitting constant may be employed over a wide range of gamma-ray pulse energies.

Figure 15:
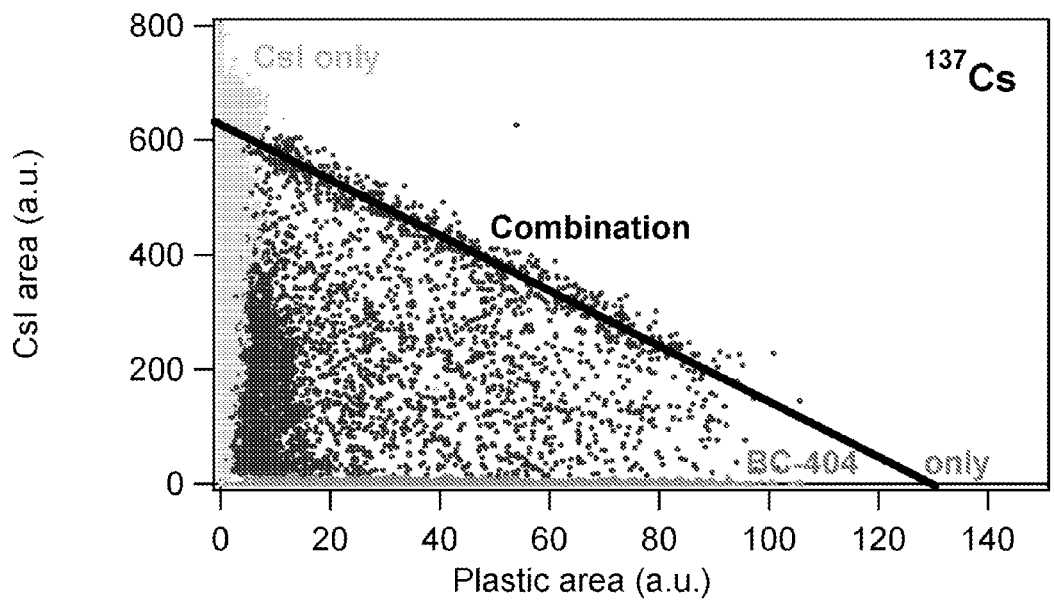
FIG. 15 shows a plot of CsI(Tl) energy versus area in the first 100 ns integration period $\Sigma_p$ for a phoswich illuminated with 662 keV gamma-rays from $^{137}$Cs.

As discussed above, the constants $k_p$ and $k_c$ can be determined by exposing the transducer either to, in turn, beta-rays and gamma-rays of known energy and plotting spectra of raw $\Sigma'_c$ and $\Sigma'_{\beta p}$ values, identifying known peaks, and extracting scaling constants. If no convenient beta source is available, Compton scattering can be used to determine $k_p$. In this method, the transducer is exposed to a mono-energetic gamma-ray source and coincident pulses plotted on a graph of $\Sigma'_{\beta p}$ versus $E_\gamma$. The primary source of coincidences will be gamma-rays that scatter from the BC-404 into the CsI(T1). Because the most common Compton scattering event will divide the full energy $E_f$ of the gamma-ray between the two scintillators, these events will form a straight line between $E_f$ on the $E_\gamma$ axis and the point $\Sigma'_{\beta p}$)$E_f$) on the $\Sigma'_\beta$ axis. $k_p$ is then the value that scales $\Sigma'_{\beta p}(E_f)$ to $E_f$. FIG. 15 shows such a plot made by exposing this preferred implementation phoswich to 662 keV gamma-rays from $^{137}$Cs. The straight line marks the Compton scatter events and intersects both the gamma-ray and beta-ray energy axes at 662 keV. This establishes the equivalence between 132 plastic area units and 662 keV, or about 5 keV/area unit.

1.5. Application to Radio-Xenon Measurements

Figure 16:
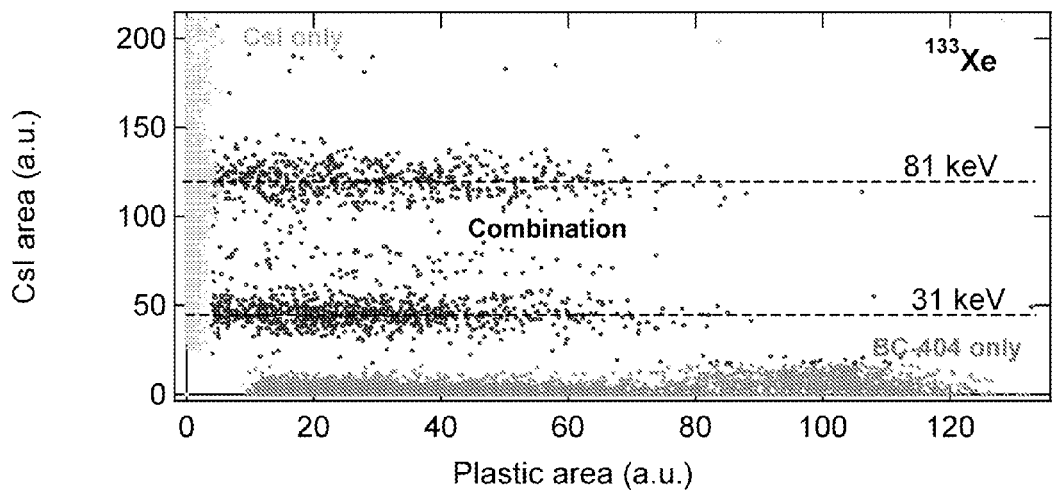
FIG. 16 shows a plot of gamma-ray energy versus beta-ray energy from a sample of $^{133}$Xe taken with the implementation shown in FIG. 6.

To test this implementation, as shown in FIG. 6 and described above, we collected data from a sample of $^{133}$Xe. $^{133}$Xe has a half life of 5.24 days, emits a primary gamma-ray at 81 keV (37%), an x-ray at 31 keV (48.9%), a beta-ray with endpoint energy 346 keV (99%), and a conversion electron at 45 keV (54%). FIG. 16 shows the data. For each detected event we have plotted $\Sigma'_c$ versus $\Sigma'_{\beta p}$, which were obtained per Eqns. 8 and 9. No cuts have been applied to the data and the calibration constants $k_c$ and $k_p$ have not yet been applied. As may be seen, there is a cluster of points close to the CsI(T1) axis at values of less than 6 ADC units (30 keV) plastic energy. These points are nominally $E_\beta$ equal zero points (i.e., gamma-only events). A second cluster of points lies close the BC-404 axis at values of less than 20 ADC units (12 keV) CsI(T1) energy. These points are nominally $E_\gamma$ equal zero points (i.e., beta-only events). Finally, there are two horizontal clusters at $\Sigma'''_c$ equal to 47 and 122 that have both crystal and plastic energy. These are coincidence events about the gamma-ray energies of 81 keV and 31 keV as marked. This demonstrates that this implementation can clearly accomplish the detection of coincidence events and measure their gamma-ray and beta ray energies as well.

Figure 17A:
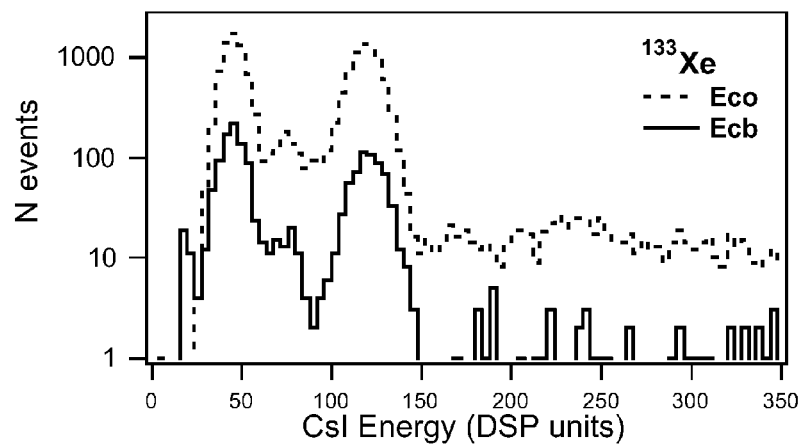
FIG. 17A shows a projection onto the CsI(Tl) energy axis of both the gamma-only ($E_{co}$) and beta-gamma coincidence points ($E_{cb}$) in FIG. 16.

To evaluate the energy resolution of this implementation, we use cuts at $E_\beta$ equals 6 ADC units and $E_\gamma$ equals 20 ADC units to separate the three types of events into the cases "plastic-only" ($E_\gamma$<20 ADC units), "CsI-only" ($E_\beta$<6 ADC units), and "coincidences" $E_\gamma \geq 20$ ADC units and $E_\beta \geq 6$ ADC units). We then projected both the "CsI-only" ($E_{co}$) and "coincidences" ($E_{cb}$) onto the $E_\gamma$ axis, as shown in FIG. 17A. We similarly projected both the "plastic-only" ($E_{po}$) and "coincidences" ($E_{pb}$) onto the $E_\beta$ axis, as shown in FIG. 17B.

The "CsI-only" spectrum FIG. 17A from CsI shows two major lines, at 31 and 81 keV, plus a Compton background at higher energies from higher energy background gamma-radiation that lies above the range of this plot. The 31 keV band is also well separated from the "plastic-only" events that lie below 12 keV. In the "coincidences" gamma-ray spectrum we see the same two peaks, reduced in amplitude due to the relatively poor geometric efficiency of this design (maximum theoretical detection of only 25% from a single sided measurement), but the Compton background has been substantially eliminated, with only a relatively small number of channels having 1, 2 or, rarely, 3 counts. The resolution of the 81 keV peak was 16.9% for the CsI only events and 17.1% for the coincidence events, which indicates that there is no substantial degradation in gamma-ray energy resolution due the application of the pulse shape analysis algorithm. We note that the Cs escape peak from 81 keV is clearly visible in the spectrum at 45 keV in spite of the relatively poor statistics even in the coincidence spectrum. In fact, the energy resolution obtained (17.1%) at 81 keV using this implementation is significantly better than that obtained (27%) at the same energy in the original ARSA system.

Figure 17B:
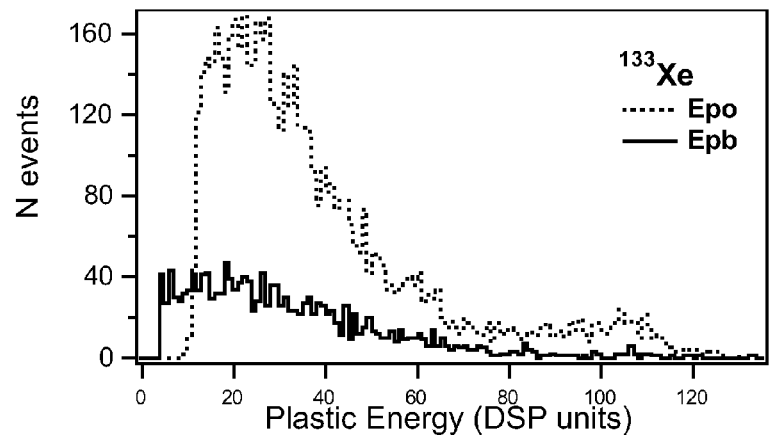
FIG. 17B shows a projection onto the BC-404 energy axis of both the beta-only ($E_o$) and beta-gamma ($E_b$) coincidence points in FIG. 16.

The "plastic-only" spectrum FIG. 17B from BC-404 shows two endpoints. The first, at 70 DSP units (350 keV) is that expected from the major beta-ray component (end point energy 346 keV). The second is from a minor component with an endpoint energy of 120 DSP units (600 keV). Since only the former process is in coincidence with a gamma-ray, the "coincidences" spectrum only shows the first process with its 350 keV endpoint. FIG. 17A and FIG. 17B therefore clearly show that this implementation of the invention is not only working correctly, but that it also provides superior performance to the original ARSA system while using a transducer with only a single PMT. It is also worth further emphasis that this is a novel application of a phoswich. Phoswiches are traditionally made to produce different pulse shapes in response to different radiations and pulse shape algorithms were developed to then identify which single radiation produced any given detected pulse. See, for example, the Miller patent [MILLER-1994] and references therein. To the limited extent that these methods could detect whether more than a single radiation contributed to a pulse, this information was only used to discard such events as piled up. For example, see Miller, Column 4, lines 36-44[MILLER-1994].

2. Embodiment for Use with Gaseous Samples

2.1. Physical Description

Figure 18:
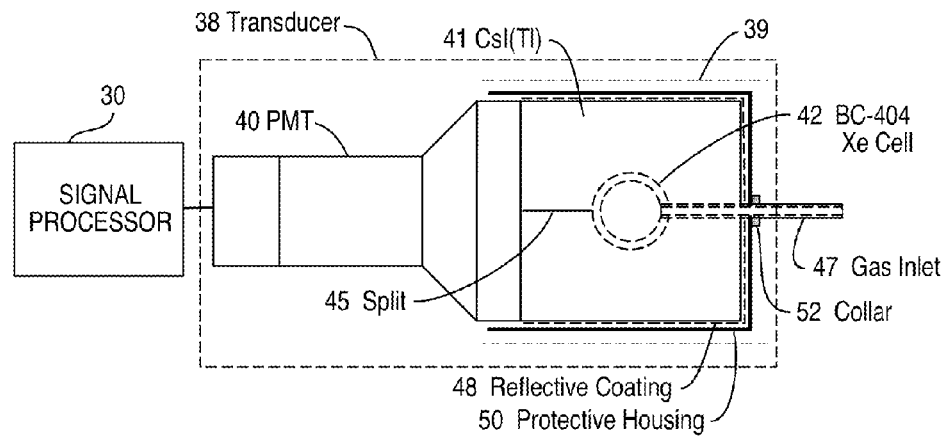
FIG. 18 shows a preferred implementation of the invention for use with gaseous samples.

While the embodiment presented above works well, particularly for samples that can only be measured from a single side (i.e., planar samples), it is not optimum for the ARSA application, where a very weak gaseous sample is to be measured and it is critical to maximize signal to background by capturing as many coincident events as possible. A preferred implementation for the case of gaseous samples is shown in FIG. 18. This design also uses a single transducer 38, comprising a phoswich 39 coupled to a PMT 40, that is directly coupled to a Signal Processor 30, similarly to the design of FIG. 6, although in this case the PMT is a 3" diameter Electron Tubes, Inc. Model 9305 KB with a PS1819-5 base. The signal processor 30 is the same Pixie-4 used before. The phoswich 39 is now a 3" diameter cylinder of CsI(Tl) that is 3" high and encloses at its center a BC-404 Xenon Cell 42 that is a hollow sphere 1 " in diameter with a wall thickness of 2.5 mm. As per the discussion of our first implementation, other materials could be used effectively (i.e., other fast plastics for BC-404 and NaI(Tl) for CsI (Tl)).

To allow for the inclusion of the Xenon Cell, the CsI(Tl) crystal is Split 45 along a plane through its center that is perpendicular to the face of the PMT 26. The surfaces of the Xenon Cell 42 and Split 45 are coated with optical coupling compound during assembly of the phoswich 40 using standard methods and materials that are well known in the art. The Xenon cell connects to the outside world through an opaque Gas Inlet tube 47 that allows the Xenon cell to be evacuated and filled with samples to be measured. The connection between the Gas Inlet and Xenon Cell may be made by gluing, welding or other appropriate joining technique as may be appropriate to the two materials involved. As before, the surface of the CsI(Tl) is coated with a reflective coating 48 and sealed in a protective housing 50, again using methods and materials well known to the art. In order to prevent light leakage, the Gas Inlet 47 is sealed to the Protective Housing 50 using, for example, a Collar 52 of opaque epoxy material or other joining technique. In practice, to reduce extraneous background counts, the entire assembly of phoswich 40 and PMT 38 is enclosed in a low background Copper sheath and placed into a Lead cave for measurements, both methods being well known to the art.

2.2. Design Considerations

In order to optimize performance, several design issues must be considered. A primary issue in the radio-Xenon measurement case is to optimize the probability of capturing beta-gamma coincidences. We therefore want to maximize the probability of capturing beta-rays in the BC-404, while minimizing interactions between x-rays and gamma-rays in the same material. Because BC-404 is a low density plastic, this is readily achieved, even for x-ray energies as low as 30 keV. Our modeling studies show that about 20% of 30 keV x-rays will absorb in 5 mm of BC-404 and decrease approximately linearly with thickness (e.g., 8% at 2 mm thickness). On the other hand, when the BC-404 is only 1 mm thick, 30% of all 905 keV beta particles will deposit at least some energy in the CsI(Tl), a number that drops to about 5% when the BC-404 is 2 mm thick. Since the BC-404 is much more transparent to higher energy gamma-rays and more opaque to lower energy beta-rays, these two cases set the limits on the design. Values between 2 and 3 mm are optimum, leading to the design value 2.5 mm (0.10") described above.

A second criterion is that gamma-ray absorption should also be efficient in the CsI(Tl). The highest energy gamma-ray is at 250 keV from the $^{135g}$Xe isotope, which has a half life of 0.38 days. Our design value of 1" of CsI(Tl) surrounding the BC-404 captures approximately 85% of this energy, and is somewhat more efficient at capturing the 233 keV radiation from $^{133m}$Xe, although the latter is a low probability (10%) decay path. Therefore, if the technical decision were made to ignore $^{135g}$Xe on the grounds that its half life is too short for useful measurements, the thickness of the CsI(Tl) could be significantly reduced, since the next energy with any large probability of occurring is 81 keV from $^{133g}$Xe, which has a 5.24 day half life. In this case the CsI(Tl) component of the phoswich could easily be reduced to a 2" diameter cylinder 2" high, which would both reduce costs and improve energy resolution.

Figure 20:
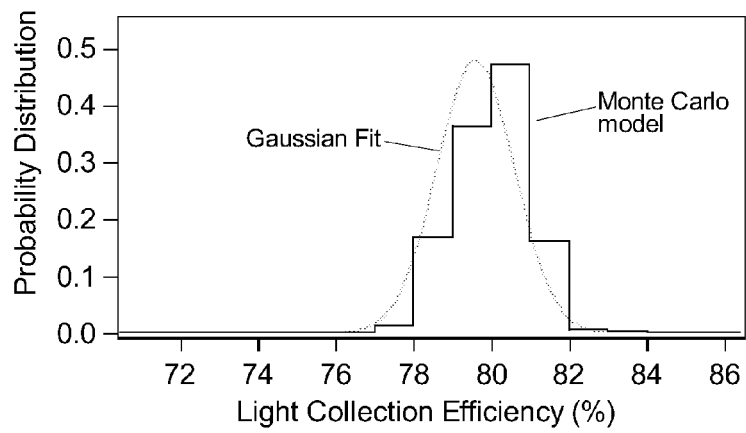
FIG. 20 shows volume-weighted probabilities of light collection from the model shown in FIG. 19.
Figure 19:
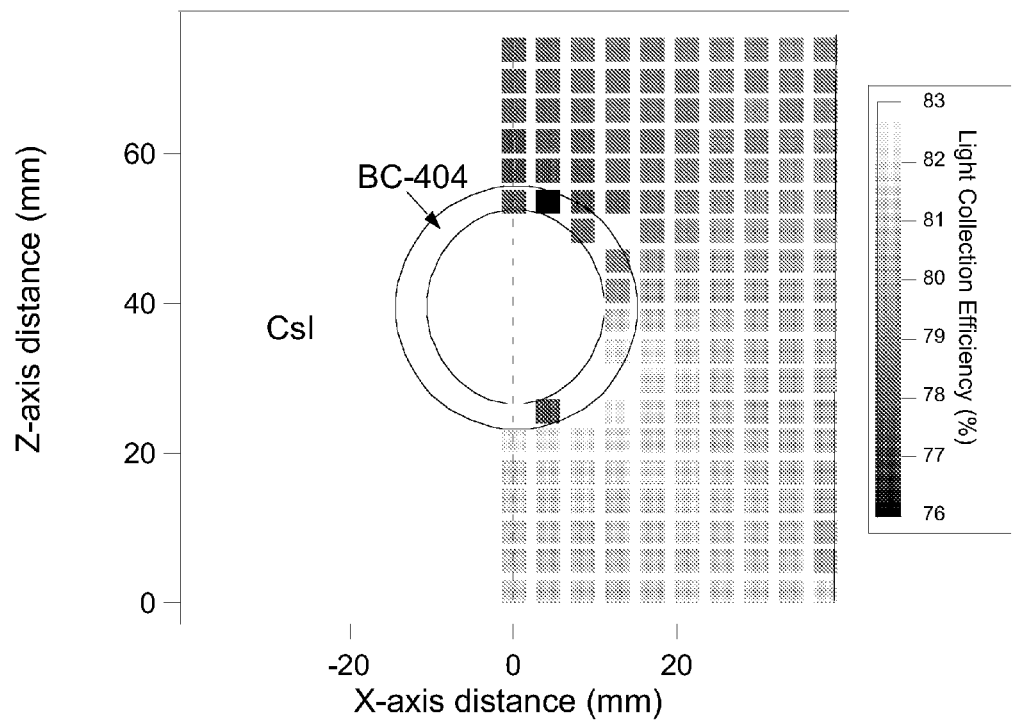
FIG. 19 shows the results of Monte Carlo modeling of the light collection efficiency of the design shown in FIG. 18 for a particular set of phoswich dimensions.

Finally, for best energy resolution, light collection efficiency should be as uniform as possible from the entire CsI(Tl) volume. FIG. 19 shows the result of a Monte Carlo investigation of light collection from our preferred implementation, assuming that the reflectivity of the Reflective Coating 48 is 95%. The amount of generated light that reaches the PMT is fairly uniform, varies between about 78 and 82% over most of the volume. A few points (e.g., the underside of the BC-404 shell) have slightly higher efficiency and a few points (e.g., the topside of the BC-404 shell) have slightly lower efficiency. FIG. 20 shows a plot of the volume weighted collection efficiency from FIG. 19. The full-width-half-max (FWHM) of the shown Gaussian fit to the data is about 3%, which, added in quadrature to even the best CsI(Tl) energy resolution of about 7% does not significantly degrade energy resolution (i.e., to 7.6%).

Figure 1:
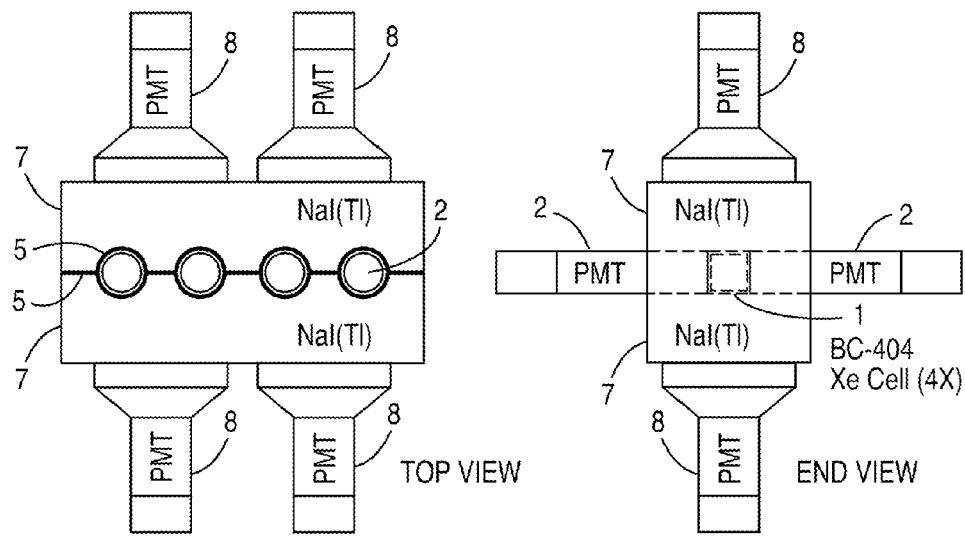
FIG. 1 shows a schematic drawing of the prior art ARSA radio-Xenon detector system developed by PNNL.
Figure 2A:
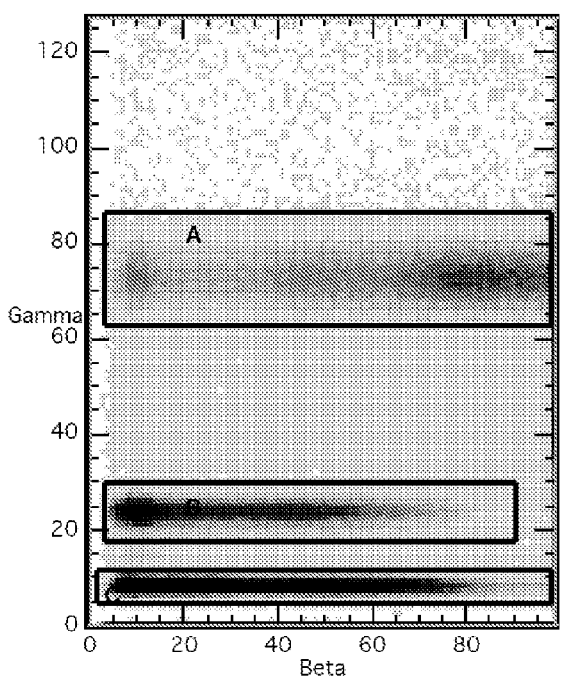
FIG. 2A shows a plot of photon energy versus beta particle energy measured using the ARSA system of FIG. 1 when measuring a sample of radioactive Xenon (radio-Xenon)
Figure 2B:
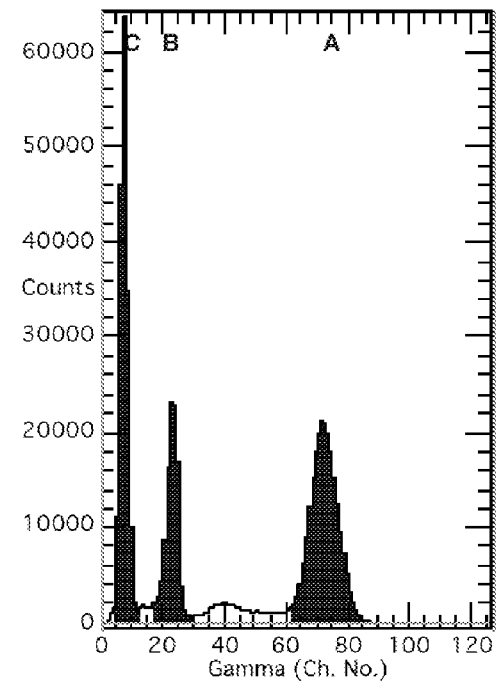
FIG. 2B shows the gamma-ray spectra found by projecting the plot of FIG. 2A against the zero beta energy axis.
Figure 3:
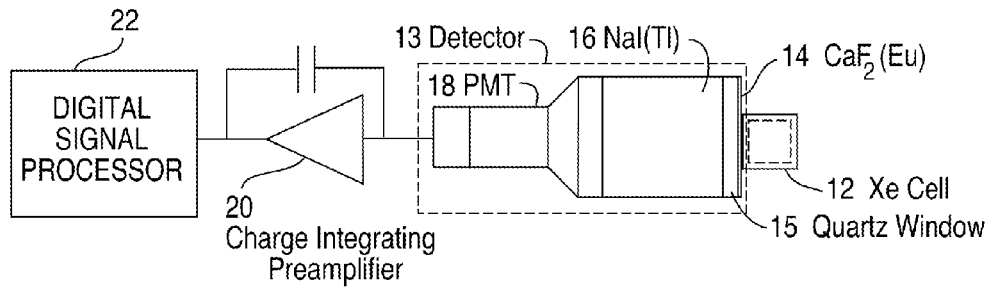
FIG. 3 shows a schematic of PNNL's prior art radio-Xenon detector system based on a phoswich.

FIG. 19, however, was computed assuming that there were only two interfaces in the transducer: between the BC-404 and the CsI(T1) and between the CsI(T1) and the PMT, both filled with a thin layer of optical couplant. Because the introduction of additional interfaces (e.g., the Split 45) introduces additional reflecting surfaces, which can add further increases to the variability of light collection efficiency within the transducer, their placement need careful consideration, particularly since at least one partition is required to introduce the BC-404 shell into the phoswich. The placement of the Split 45 as shown is preferred, since it leaves paths open between the top and bottom of the transducer that do not require the transversal on an interface. In one developmental design we studied, a 1" diameter, 1" tall cylindrical BC-404 shell was embedded into the 3" diameter, 3" tall CsI(T1) cylinder by splitting the CsI(T1) into two cylinders, one 1" tall and one 2" tall, boring a 1" hole into the latter, inserting the BC-404 shell into the hole and then cementing the two CsI(T1) cylinders together, leaving a Split perpendicular to the PMT face 1" away from it. The resultant energy resolution in this design was significantly worse than that of either our first preferred implementation shown in FIG. 6 or of the ARSA system shown in FIG. 1.

Modeling results show that this implementation is highly efficient for capturing beta-gamma coincidence events. Table 1 below presents a brief synopsis of these results. As may be seen, we achieve essentially 100% detection efficiency for the major decay paths for all the radio-Xenon isotopes except $^{133g}$Xe, whose half life is so short that it will typically be difficult to detect in any event.

TABLE 1

Detection efficiency for the several radio-Xenon isotopes.

| Isotope | ½ Life (days) | Beta E (keV) | Captured (%) | Gamma E (keV) | Captured (%) | Efficiency (%) |
|---|---|---|---|---|---|---|
| $^{131m}$Xe | 11.84 | 129 | 100 | 30 | 100 | 100 |
| $^{133g}$Xe | 5.24 | 346 | 100 | 81 | 100 | 100 |
| $^{133m}$Xe | 2.19 | 199 | 100 | 30 | 100 | 100 |
| $^{135g}$Xe | 0.38 | 905 | 95 | 250 | 85 | 81 |

3. Methods for Handling Longer Time Separations in "Coincidence"

The methods described above are intended to work when the time separation between the emission of the first radiation (beta-ray) and second radiation (gamma-ray) is short compared to the decay times of the two scintillators since the placement of the integration periods are based on a single detection of the pulse. In the shown implementations using BC-404, this means that the two emissions must occur within a few ns of each other. While this works very well for the original radio-Xenon detection application, there are many other isotopes that emit radiations that are separated by longer periods of time and the ability to detect these as falling within a predetermined coincidence window could also be used either to reduce background rates or to identify specific decay chains.

In the case where the two emissions are separated by times that are significantly longer than the light decay times of the two scintillators, then the above methods will continue to operate, subject only to providing: 1) means to measure the time between successively detected events; and, 2) a window time W within which to test for coincidence. That is, in this case the first radiation will be detected as a "first radiation only" event and the second radiation will be detected as a "second radiation only" event, and the time between them will be recorded as "δ." Then, if δ is found to be less than or equal to W, the event is recognized as a coincidence. Clearly, since the order of the emissions is defined by the decay process, detecting the second radiation first, followed by the first radiation within the time window W will not be recorded as a coincidence because such a sequence violates the physics of the emission process.

Figure 21:
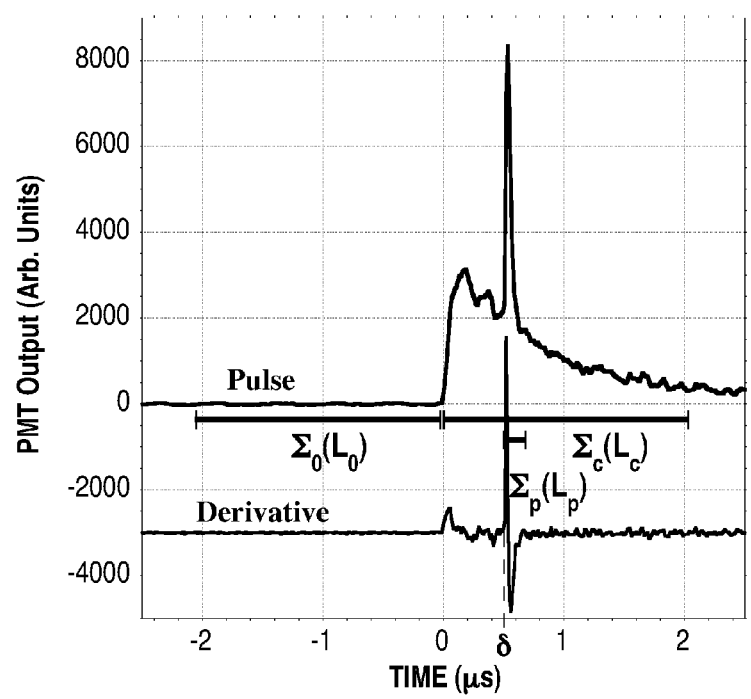
FIG. 21 shows a pulse where the radiation absorbed in the fast scintillator arrives 0.5 μs after the radiation absorbed in the slow scintillator.

The non-trivial coincidence case is the one where the radiation detected by the faster scintillator (here BC-404) arrives after the radiation detected by the slower scintillator (here CsI(T1). This case is illustrated in FIG. 21, which shows a phoswich output pulse where the radiation absorbed in the fast scintillator arrives at δ equals 0.5 μs after the radiation absorbed in the slow scintillator. We recall, and observe in the figure, that the risetime of the slow scintillator is about 100 ns, while the risetime in the fast scintillator is more like 20 ns. Thus, in the pulse's derivative (shown offset by 3000), there is first a small peak that rises cleanly above the background and that signals the arrival of the slow CsI(T1) pulse, followed 0.5 μs later by a very large, sharp peak that signals the arrival of the fast BC-404 pulse. We observe that the derivative's background level is much larger after the arrival of the CsI(T1) pulse than before, due to photon statistics in the CsI(T1) pulse itself.

Thus, while a first discriminator trigger threshold can be set quite low before the pulse is detected, it must be raised significantly after the detection point to avoid false triggering on the larger background. For this implementation to function effectively, we therefore implant time dependent discrimination, where we set a trigger level to a first value $T_1$ prior to pulse detection and then raise it to a second value $T_2$ for a period $W_2$ following detection, after which it is returned to the value $T_1$. $W_2$ will typically be some multiple M of the decay time of the slow scintillator (e.g., 8). As an added refinement, we could also make $T_2$ a decreasing function of time, to match the decaying amplitudes of the photon fluctuations in time.

An evaluation of the data in FIG. 21 shows that $T_1$ can be conservatively set to 50 (since there are no derivative values much above 25), while $T_2$ must be set to approximately 200, since the largest fluctuations in the derivative have values approaching 150. There is no difficulty in detecting the fast scintillator with this discriminator setting. For the shown pulse the maximum derivative value is over 8000, so that this method could reliably detect fast pulses whose amplitude was 40 times smaller than that shown. The actual settings used in any particular case, of course, will depend upon the particular energies to be detected and on the characteristics of the scintillators employed. If desired, we can also measure the time (i.e., number of samples) for which a purported fast pulse exceeds $T_2$ and use this test to distinguish real fast pulses from extremely large slow pulses that might also exceed $T_2$ but will have much wider pulse widths.

Having detected the arrival of both pulses with our modified discriminator, we can now place the integration periods $\Sigma_0$ of length $L_0$, $\Sigma_C$ of length $L_C$, and $\Sigma_p$ of length $L_p$ as shown in FIG. 21. We can now extract the energies $E_\beta$ and $E_\gamma$ by repeating the analysis resulting in Eqn. 7, with the difference that, in general, the ratios $R_{\beta c}$ and $R_{\gamma p}$ would now be functions of the delay δ. Thus, for example, the amount of slow pulse area integrated by $\Sigma_p$ depends upon the time delay δ between the start of the slow pulse and the start of $\Sigma_p$ at the arrival of the fast pulse. In our preferred implementation, however, we make $S_1$ long enough to completely capture the fast plastic response pulse and always lies within $S_2$, so that $R_{\beta c}$ equals unity. Then, by measuring a series of CsI(T1) pulses, we can produce a lookup table of $R_{\gamma p}(\delta)$ versus $\delta$, allowing Eqn. 7 to be solved on a pulse by pulse basis to obtain:

$$E_\gamma = k_c \Sigma'_{\gamma c} = k_c \frac{\Sigma'_c - \Sigma'_p}{1 - R_{\gamma p}} \quad (11)$$

and $$E_\beta = k_p \Sigma'_{\beta p} = k_p \frac{\Sigma'_p - R_{\gamma p} \Sigma'_c}{1 - R_{\gamma p}}.$$

This method therefore extends our basic pulse shape analysis to accommodate situations in which the two signals from the phoswich do not necessarily arrive simultaneously.

In cases, when the pulse decay constants or amplitudes do not differ so drastically that it is easy to use a simple discriminator to place $S_1$ and $S_2$, a more sophisticated pulse shape analysis may be required. Thus, rather than making integrals over fixed periods $S_1$ and $S_2$, we can instead digitally capture the transducer's pulse output y(i) and fit it using a function of the form y(i)=$E_1 T_1(i-\delta) + E_2 T_2(i)$, where $T_1(i)$ is a template of the first output pulse shape having unit area, $T_2(i)$ is a template of the second output pulse shape having unit area, $\delta$ is the difference between the arrival times of the two radiations, and $E_1$ and $E_2$ are their areas.

Thus the method presumes that an arbitrary pulse shape is always comprised of two basis pulse shapes: a first pulse shape produced by the capture of the first radiation and a second pulse shape produced by the capture of the second radiation. The fit is preferably done using a Least Squared Minimization technique and, as before, we determine whether the first radiation, the second radiation, or both are present based on whether $E_1$, $E_2$, or both are non-zero. If it is further the case that the amplitudes of the two basis shapes are respectively either proportional to, or at least a well defined function of, the two radiations' energies, then the extracted value $E_1$ and $E_2$ will also be representative of the radiations' energies. From the methods of the last few paragraphs, we therefore see that the concept of using pulse shape analysis to determine temporal coincidence does not a specific pulse shape analysis method.

4. References

The following are incorporated by reference:

ELY-2003: J. H. Ely, C. E. Aalseth, J. C. Hayes, T. R. Heimbigner, J. I. McIntyre, H. S. Miley, M. E. Panisko & M. Ripplinger, "Novel Beta-Gamma Coincidence Measurements Using Phoswich Detectors," 25th Seismic Research Review, #6-01, pp. 533-541 (2003); available online from the NNSA via the website https:_//_www.nemre.nnsa/coe.gov and selecting "Research Reviews."

MCINTYRE-2001: "Measurements of ambient radioxenon levels using the automated radioxenon sampler/analyser (ARSA)," in J. Radioanalytical & Nuclear Chemistry, 248, No. 3, 629-635 (2001).

REEDER-1998: P. L. Reeder, T. W. Bowyer, & R. W. Perkins "Beta-gamma counting system for Xe fission products," in J. Radioanalytical & Nuclear Chemistry, 235, Nos. 1-2, 89-94 (1998).

REEDER-2004: P. L. Reeder, T. W. Bowyer, J. I. McIntyre, W. K. Pitts, A. Ringbom, & C. Johansson, "Gain calibration of a β/γ conicidence spectrometer for automated radioxenon analysis" in Nuclear Instruments and Methods in Physics Research A521 586-599.

MILLER-1994: U.S. Pat. No. 5,347,129, issued Sep. 13, 1994 to W. H. Miller & R. R. Berliner for "System for determining the type of nuclear radiation from detector output pulse shape."

RYNES-2004: J. C. Rynes, D. Penn & P. Donohoe, "Research and Development of Radioxenon Monitoring systems," in 26th Seismic Research Review, #6-02, pp 588-597 (2004); available online from the NNSA via the wevsite https://www.nemre.nnsa/doe.gov and selecting "Research Reviews."

WARBURTON-1999: U.S. Pat. No. 5,873,054, issued Feb. 16, 1999 to W. K. Warburton and Z. Zhou for "Method and apparatus for combinatorial logic signal processor in a digitally based high speed x-ray spectrometer."

WARBURTON-2006: U.S. Pat. No. 7,065,473, issued Jun. 20, 2006 to W. K. Warburton and Michael Momayezi for "Method and apparatus for improving resolution in spectrometers processing output steps from non-ideal signal sources."

5. CONCLUSION

In the foregoing description of specific embodiments we have shown examples of a general technique for determining if two radiations occur in coincidence by examining the pulse shape of the signal output by a single transducer in response to its absorption of the two radiations. This technique not only allows the replacement of multiple transducers with a single transducer, with both reduces cost and complexity and also typically allows detection efficiency to increase by eliminating the competition for solid angle between multiple detectors. In the technique, we provide a transducer whose output has different time characteristics in response to the two radiations and then analyze the output after each event for the presence of the two responses, thereby determining if the first, the second, or both radiations were present in the detected event.

As we showed, the two radiations need not arrive simultaneously to be detected as being in coincidence within a specified time window. We described two physical embodiments. The first embodiment comprised a layered pair of scintillators BC-404 and CsI(T1), wherein the BC-404 has a fast time response to detected radiation while the CsI(T1) has a slow response, that operates effectively for the detection of coincident radiation on surfaces. This embodiment achieved a significant improvement in energy resolution over the existing ARSA system with a much reduced complexity. The second embodiment enveloped a spherical shell of BC-404 in a cylinder of CsI(T1) and was intended for measuring gaseous samples of radio-Xenon.

As we made clear in the presentation, while these embodiments are functional and effective, they were primarily presented for purposes of illustration and description. Because the taught principle is a general one, the presentation was not intended to be exhaustive or to limit the invention to the precise forms described, and obviously, many modifications and variations are possible in light of the above teaching. Thus, these embodiments were chosen and described in order to best explain the principles of the invention and its practical application to thereby enable others in the art to best utilize the invention in various embodiments and with such modifications as best suit the invention to the particular uses contemplated.

Other forms, modifications, alternative constructions and equivalents can be used and the method can be applied to measurements in other areas than those described. As a first example, while our preferred implementations detected two radiations in coincidence, it is clear from the method that more than two radiations could be so detected by constructing a transducer with the appropriate characteristics. Thus, by adding a third scintillator with a time constant lying between those of BC-404 and CsI(T1), a third radiation could be detected by adding a third integration period and extending the presented equations appropriately.

As a second example, while our preferred implementations were implemented using digital signal processing, it is clear from the method that analog integrators, gated by appropriate discriminator circuits, could capture integrals that would be equivalent to the summations employed in the described implementations, showing that the method is not limited to digital implementations (as mentioned above, we have used the term "integral" generically to encompass both sums of digital values and integrals of analog signals).

As a third example, while our preferred implementations allowed us to determine radiation type (beta or gamma), energy, time of arrival and/or coincidence, the same approach can be used to determine other properties by configuring the transducer to be sensitive to the desired property. As a simple illustration, consider a phoswich whose left half is BC-404 and right half is CsI(T1) and is therefore spatially sensitive in that it can therefore detect whether it is absorbing radiation from the left or right. Thus, while in our preferred implementation, the two "radiations" have been of different type (e.g., beta-ray and gamma-ray) and, typically, of different energies as well, this is not intended to be a limitation of the method. The two "radiations" can differ instead (or additionally) in some other property, such as point of origin.

Therefore, the above description should not be taken as limiting the scope of the invention, as defined by the appended claims.

What is claimed is:

1. A method for determining if two radiations are in coincidence by:
    providing a transducer that,
        when it absorbs a first radiation, produces an output pulse that is characterized by a first, shorter, time constant, and
        when it absorbs a second radiation, produces an output pulse that is characterized by a second, longer, time constant;
    detecting the output pulse produced by said transducer when it absorbs radiation;
    forming a first integral of said pulse over a first time period representative of said first time constant and a second integral of said pulse over a second time period representative of said second time constant; and
    examining the values of said first and second integrals to determine whether said first radiation, said second radiation, or both were absorbed in the transducer, the latter condition defining a coincident absorption event.

2. The method of 1 wherein said first and second time periods are separate in time.

3. The method of claim 1 wherein said first and second time periods overlap in time.

4. The method of claim 1 wherein a discriminator is applied to the output of said transducer and the output of said discriminator is compared to one or more thresholds to set the locations of said first and second time periods.

5. The method of claim 1 wherein:
    the output pulse produced when said transducer absorbs said first radiation has an area that is nominally proportional to the energy of said absorbed first radiation;
    the output pulse produced when said transducer absorbs said second radiation has an area that is nominally proportional to the energy of said absorbed second radiation; and
    the method further includes determining individual energies of one or both of the radiations from the values of said first and second integrals.

6. The method of claim 5 wherein determining whether said first radiation, said second radiation, or both radiations were absorbed in the transducer is based upon whether the determined energies of said first radiation or second radiation or both radiations exceed specified threshold values.

7. The method of claim 1 wherein said transducer includes a phoswich optically coupled to a light-to-electrical converter whose electrical output is nominally proportional to its optical input, said phoswich comprising a set of two or more optically coupled scintillator materials having different light decay time constants, wherein said scintillator materials include:
    a first scintillator having a shorter time constant and that is primarily sensitive to said first radiation, and
    a second scintillator having a longer time constant and that is primarily sensitive to said second radiation.

8. The method of claim 7 wherein said light-to-electrical converter is a photomultiplier tube.

9. The method of claim 7 wherein said light-to-electrical converter is a photodiode.

10. The method of claim 7 wherein said first time period of integration includes the start of the detected pulse and is long enough so that the integrated signal associated with said shorter time constant scintillator outside said first time period is negligible compared to the integrated light output from said shorter time constant scintillator within said first time period.

11. The method of claim 7 wherein the value of the integral associated with one scintillator is used to estimate the contribution of the signal from that scintillator to the integral associated with the other scintillator.

12. The method of claim 1 wherein, in addition to the integrals over the time periods, the pulse risetime is calculated to detect the presence of the shorter time constant component.

13. The method of claim 1 wherein the values of said integrals are corrected for offsets or non-zero signal values prior to the arrival of the pulse by making baseline measurements.

14. The method of claim 7 wherein, to detect beta-gamma coincidences,
    the first scintillator is made sensitive to beta-rays by employing a thin, low density, short decay time constant plastic scintillator; and
    the second scintillator is made sensitive to gamma-rays by employing a thicker, higher density scintillator with a longer time constant.

15. The method of claim 14 where the first scintillator is a polyvinyltoluene-based plastic scintillator and the second scintillator is either CsI(T1) or NaI(T1).

16. The method of claim 14 where the first scintillator is formed into a hollow shell that encloses the sample and is encased in the second scintillator.

17. A method for determining if two radiations are in coincidence by:

providing a transducer that,
  when it absorbs said first radiation, produces an output pulse that has a first specific pulse shape, and
  when it absorbs said second radiation, produces an output pulse that has a second specific pulse shape;
detecting the output pulse produced by said transducer when it absorbs radiation; and
applying pulse shape analysis to the detected output pulse to determine whether said first radiation, said second radiation, or both were absorbed in the transducer, the latter condition defining a coincident absorption event.

18. The method of claim 17 wherein the pulse shape analysis is performed by fitting the pulse using two templates, one representing said first specific pulse shape, the other representing said second specific pulse shape.

19. The method of claim 17 wherein the pulse shape analysis is performed by:
measuring the areas of selected regions of the output pulse shape; and
using these areas to determine whether said first specific pulse shape, said second specific pulse shape, or both are present in the pulse.

20. The method of claim 17 wherein the amplitude of at least one specific pulse shape is either proportional to or a well defined function of the energy deposited in the transducer by its associated radiation and the amount of said specific pulse shape found in the pulse by the pulse shape analysis is used to determine the energy deposited in the transducer by said associated radiation.

21. Apparatus for determining if two radiations are in coincidence, the apparatus comprising:
a transducer that:
  when it absorbs said first radiation, produces an output pulse that is characterized by a first, shorter, time constant and whose area is nominally proportional to the energy of said absorbed first radiation, and
  when it absorbs the second radiation, produces an output pulse that is characterized by a second, longer, time constant and whose area is nominally proportional to the energy of said absorbed second radiation,
a detector that detects the output pulse produced by said transducer when it absorbs radiation; and
circuitry that:
  forms a first integral of said pulse over a first time period representative of said first time constant and
  a second integral of said pulse over a second time period representative of said second time constant, and
  examines the values of said first and second integrals to determine whether said first radiation, said second radiation, or both were absorbed in the transducer, the latter condition defining a coincident absorption event.

22. The apparatus of claim 21 wherein said circuitry also determines the energies of one or both of said radiations from the values of said first and second integrals.

23. The apparatus of claim 21 wherein said transducer comprises:
a phoswich including:
  a set of two or more optically coupled scintillator materials having different light decay time constants wherein said scintillator materials include
    a first scintillator having a shorter time constant and that is primarily sensitive to said first radiation, and
    a second scintillator having a longer time constant and that is primarily sensitive to said second radiation; and
  a light-to-electrical converter optically coupled to said phoswich, said light-to-electrical converter providing an electrical output that is nominally proportional to its optical input.

24. The apparatus of claim 21 wherein said light-to-electrical converter is a photomultiplier tube.

25. Apparatus for determining if two radiations are in coincidence by:
a transducer that,
  when it absorbs said first radiation, produces an output pulse that has a first specific pulse shape, and
  when it absorbs the second radiation, produces an output pulse that has a second specific pulse shape;
a detector that detects the output pulse produced by said transducer when it absorbs radiation; and
circuitry that applies a pulse shape analysis to the detected output pulse to determine whether said first radiation, said second radiation, or both were absorbed in the transducer, the latter condition defining a coincident absorption event.

* * * * *